United States Patent
Blain Christen et al.

(10) Patent No.: US 12,259,326 B2
(45) Date of Patent: Mar. 25, 2025

(54) DRY FLUORESCENCE CALIBRATION TECHNIQUE

(71) Applicant: Arizona Board of Regents on Behalf of Arizona State University, Tempe, AZ (US)

(72) Inventors: Jennifer Blain Christen, Chandler, AZ (US); Joshua Eger, Chandler, AZ (US); Mark Bailly, Chandler, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 201 days.

(21) Appl. No.: 17/970,424

(22) Filed: Oct. 20, 2022

(65) Prior Publication Data
US 2023/0324299 A1    Oct. 12, 2023

Related U.S. Application Data

(60) Provisional application No. 63/257,888, filed on Oct. 20, 2021.

(51) Int. Cl.
*G01N 21/64* (2006.01)

(52) U.S. Cl.
CPC ... *G01N 21/645* (2013.01); *G01N 2021/6471* (2013.01); *G01N 2201/12746* (2013.01)

(58) Field of Classification Search
CPC ......... G01N 21/645; G01N 2021/6471; G01N 2201/12746
See application file for complete search history.

(56) References Cited

U.S. PATENT DOCUMENTS

| | | | |
|---|---|---|---|
| 6,987,563 B2 | 1/2006 | Hudson | |
| 7,630,072 B2 | 12/2009 | Feke et al. | |
| 9,400,251 B2 | 7/2016 | Nitta | |
| 11,467,156 B2* | 10/2022 | Chilkoti | G01N 27/227 |
| 2003/0012702 A1 | 1/2003 | Hudson | |
| 2009/0159801 A1 | 6/2009 | Knapp et al. | |
| 2010/0268504 A1* | 10/2010 | Misener | G01N 21/59 |
| | | | 702/104 |
| 2021/0318224 A1 | 10/2021 | Hara et al. | |

(Continued)

FOREIGN PATENT DOCUMENTS

| | | |
|---|---|---|
| CN | 1987935 B | 6/2010 |
| CN | 108474874 A | 8/2018 |
| DE | 102010061182 A1 | 6/2012 |

(Continued)

OTHER PUBLICATIONS

Hendriks et al., (2007), "Automatic channel unmixing for high-throughput quantitative analysis of fluorescence images," Optics Express, vol. 15, No. 19, Sep. 17, 2007, 12 pages.

(Continued)

*Primary Examiner* — Dani Fox
*Assistant Examiner* — Fani Polyzos Boosalis
(74) *Attorney, Agent, or Firm* — Polsinelli PC

(57) ABSTRACT

Disclosed are a dry calibration device for calibrating fluorescent detectors and methods of making and using such a device to obtain accurate calibration of single site and multiplexed fluorescent detectors. The device comprises slides that use phosphorescent material with neural density filters to replicate varying fluorophore concentrations.

19 Claims, 19 Drawing Sheets

(56) References Cited

U.S. PATENT DOCUMENTS

2023/0324299 A1  10/2023  Blain Christen et al.

FOREIGN PATENT DOCUMENTS

| DE | 102020212182 B3 * | 1/2022 | ......... A47L 15/4229 |
|---|---|---|---|
| DE | 102005049364 B4 | 5/2023 | |
| EP | 2024727 B1 | 3/2010 | |
| EP | 1703271 B1 | 8/2010 | |
| EP | 2145925 B1 | 10/2011 | |
| EP | 2988950 B9 | 10/2017 | |
| EP | 3438624 A1 | 2/2019 | |
| JP | 2007071742 A | 3/2007 | |
| JP | 2007071743 A | 3/2007 | |
| JP | 2007097583 A | 4/2007 | |
| WO | 2016066156 A2 | 5/2016 | |
| WO | WO-2017109057 A1 * | 6/2017 | ........... G01N 21/278 |

OTHER PUBLICATIONS

Talbot et al., (2008), "High Speed, Optically Sectioned Fluorescence Lifetime Imaging utilizing Time-gated Nipkow Disk or Multifocal Multiphoton Time Correlated Single Photon Counting Microscopy," BioMed/DH/Lacsea 2008, 3 pages.

DeRose et al., (2008), "Need for and metrological approaches towards standardization of fluorescence measurements from the view of national metrology institutes," Spring Series on Fluorescence, vol. 5, 2008, 499 pages.

Fu et al., (2020), "Miniaturized integrating sphere light sources based on LEDs for radiance responsivity calibration of optical imaging microscopes," Optics Express, vol. 28, No. 21, Oct. 12, 2020, 15 pages.

Hubold et al., (2021), "Multi-aperture system approach for snapshot multispectral imaging applications," Optics Express, vol. 29, No. 5, Mar. 1, 2021, 18 pages.

Herman, B., "Resonance energy transfer microscopy, in: Fluorescence Microscopy of Living Cells in Culture," Part B, Methods in Cell Biology, vol. 30, ed. Taylor, D. L. & Wang, Y.- L., San Diego: Academic Press (1989), pp. 219-243.

Lakowicz, J. R., Principles of Fluorescence Spectroscopy, New York: Plenum Press (1983).

Turro, N.J., Modern Molecular Photochemistry, Menlo Park: Benjamin/Cummings Publishing Col. Inc. (1978), pp. 296-361.

* cited by examiner

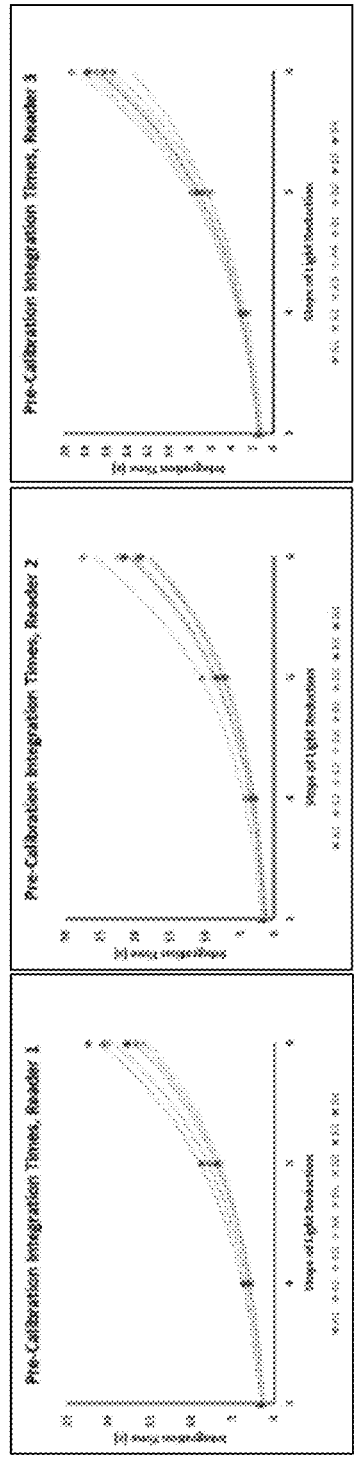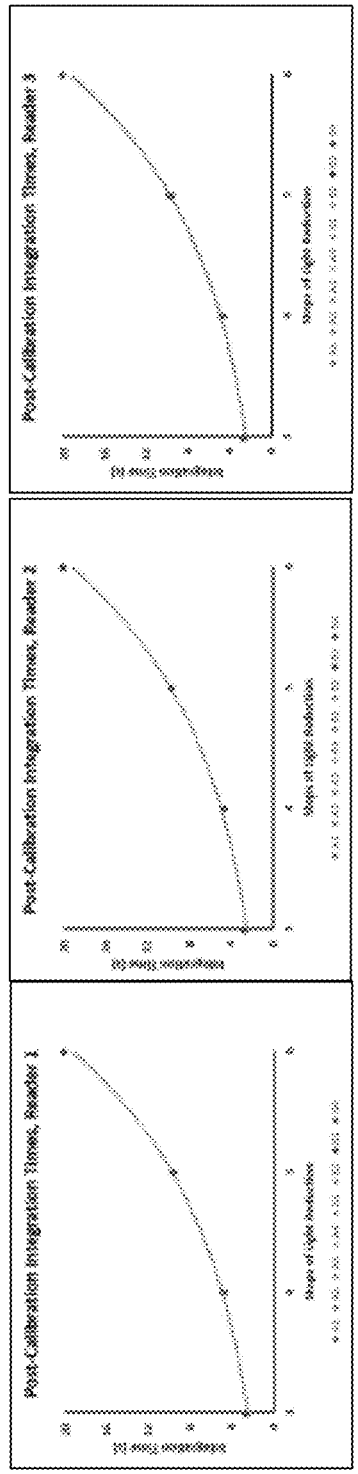
FIG. 9A  FIG. 9B  FIG. 9C  FIG. 9D  FIG. 9E  FIG. 9F
Pre-Calibration
Post-Calibration

DRY FLUORESCENCE CALIBRATION TECHNIQUE

CROSS-REFERENCE TO RELATED APPLICATIONS

This application claims priority from Provisional Application No. 63/257,888, filed Oct. 20, 2021, the entire contents of which are hereby incorporated by reference.

GOVERNMENTAL RIGHTS

This invention was made with government support under CA211415 awarded by the National Institutes of Health and 1521904 awarded by the National Science Foundation. The government has certain rights in the invention.

FIELD OF THE INVENTION

The present disclosure provides device and methods for calibration of fluorescence detectors.

BACKGROUND OF THE INVENTION

Fluorescence-based assays are extensively used in scientific research, clinical pathology labs and point-of-care clinics to determine the concentration of fluorescently labelled target molecules. However, the accuracy of these assays depends on careful calibration of fluorescent detectors due to statistically significant inter-site variations. It has been observed that each site within the fluorescence detector produces a unique calibration curve and a given fluorophore concentration does not yield consistent integration times across all sites. This inter-site variation may arise from variations introduced during the manufacturing processes of the fluorescence detector. Currently, wet calibration techniques are used to minimize these inter-site variations. This requires careful preparation of slides with varying concentrations of fluorophores, which is time-consuming and error prone. The slides suffer from low durability and are not reusable. There exists a need to develop alternate calibration techniques that provide higher accuracy and reusability, while minimizing production time.

SUMMARY OF THE INVENTION

One aspect of the present disclosure encompasses a device for performing dry calibration of a fluorescence detector, the device comprising a first layer comprising a dry phosphorescent material positioned adjacent to a second layer comprising a neutral density filter, and a housing containing the first and second layers.

In a related aspect the first layer of the dry phosphorescent material is positioned on a top surface of the second layer comprising the neutral density filter.

In a related aspect the housing comprises at least two portions each comprising a plastic material, the two portions configured to reversibly engage one another to form the housing. The housing may comprise a plastic material selected from the group consisting of polylactide (PLA), acrylonitrile butadiene styrene (ABS), polyethylene terephthalate glycol (PETG), nylon, thermoplastic urethane, polyvinyl alcohol, high impact polystyrene (HIPS), or a composite comprising carbon fiber, Kevlar, or fiberglass.

The present disclosure further encompasses the dry calibration device in the form of a slide.

In some aspects of the present disclosure the dry phosphorescent material used in the dry calibration device is a material characterized by the ability to reproduce a Stokes-shifted light emission associated with a selected fluorophore.

In some aspects, the dry phosphorescent material mimics the selected fluorophore by absorbing light emitted by an LED of the fluorescence detector and emitting light that passes through the emission filter of the fluorescence detector.

In some aspects, the phosphorescent material is selected based upon the excitation and emission characteristics of the selected fluorophore, and the optical configuration of the fluorescence detector.

In some aspects, the phosphorescent material is selected from R600, R620, R630, R640, R650, R660, R675, R01, and R675.

In some further aspects of the current disclosure, the neutral density filter comprises a material capable of simulating different fluorophore concentrations by adjusting the stops of light reduction.

In some aspects, the neutral density filter is configured to modulate light intensity by modifying (increasing) the stops of light reduction.

In some aspects, the neutral density filter is configured to increase the stops of light reduction by a predetermined factor and thereby decrease light intensity by a corresponding predetermined factor.

In some further aspects of this disclosure the housing further defines at least one or a plurality of apertures therethrough, wherein each aperture aligns with a calibration site of the fluorescence detector.

In some aspects, the housing aperture size (diameter) is selected to modulate light intensity, wherein light intensity is modulated by increasing or decreasing the aperture diameter.

Another aspect of the present disclosure encompasses a method of making a calibrating device for performing a dry calibration of a fluorescence detector, the method comprising the steps of obtaining or having obtained a plastic housing having a top portion and a bottom portion defining a recess, the top and bottom portions configured to reversibly engage one another to form the housing, positioning a layer of a neutral density filter material in the recess of the bottom housing portion, stacking a layer of a dry phosphorescent material on top of the neutral density filter layer and positioning the housing top portion over the housing bottom portion and engaging the housing bottom portion with the housing top portion to form the housing.

In some aspects, the method further comprises applying an adhesive to interior contact surfaces of either or both of the housing portions before engaging the housing bottom portion with the housing top portion.

In some aspects, the plastic housing comprises a printable plastic. In some aspects, the method further comprises printing the plastic housing using a 3D printer.

In some aspects, the 3-D printer is a fused deposition modeling (FDM). In some aspects, the printing comprises printing with PLA (for applications in which the operating temperature does not exceed 50° C.).

In some alternate aspects, the printing comprises printing with ABS for applications in which the operating temperature is between 50° C. and 100° C.

In some aspects of the disclosed method the phosphorescent material is selected from R600, R620, R630, R640, R650, R660, R675, R01, and R675.

In some aspects, the method comprises sizing the layer of the dry phosphorescent material and the layer of the neutral density filter to have approximately the same length and width.

Another aspect of the present disclosure encompasses a method for performing a dry calibration of a fluorescence detector with respect to a fluorophore, the method comprises, obtaining or having obtained a dry calibration slide for each of a plurality of pre-selected calibration sites in a sample, each dry calibration slide characterized by differing stops of light reduction compared to the other dry calibration slides, generating a calibration curve for each calibration site using one of the dry calibration slides for each calibration site, using varying light intensities within a dynamic range of the fluorescence detector to collect the calibration curve data plotting integration times against stops of light reduction for each calibration site and using the plot generated to calibrate each site in the fluorescence detector to determine a fluorophore concentration that results in equal reported fluorescence intensities across all sites.

In some aspects, the dry calibration slides do not comprise the fluorophore.

In some aspects, each dry calibration slide comprises a first layer comprising a dry phosphorescent material positioned adjacent to a second layer comprising a neutral density filter.

In some aspects, the first layer and the second layer are stacked with respect to each other.

In some aspects, each dry calibration slide further comprises a housing containing the first and second layers.

In some aspects, the housing comprises at least two portions each comprising a plastic material, the two portions configured to reversibly engage one another to form the housing.

In some aspects, the dry phosphorescent material in the calibration slide is a material characterized by the ability to reproduce a Stokes-shifted light emission associated with a selected fluorophore.

In some aspects, the dry phosphorescent material mimics the selected fluorophore by absorbing light emitted by an LED of the fluorescence detector and emitting light that passes through the emission filter of the fluorescence detector.

In some aspects, wherein the dry phosphorescent material is selected based upon the excitation and emission characteristics of the selected fluorophore, and the optical configuration of the fluorescence detector.

In some aspects, the neutral density filter in the calibration slide comprises a material capable of simulating different fluorophore concentrations by adjusting the stops of light reduction.

In some aspects, the neutral density filter is configured to modulate light intensity by modifying (increasing) the stops of light reduction.

In some aspects of the present disclosure the method described above comprise a dry phosphorescent material that is photostable.

In some aspects of the present disclosure the device and the method use the housing comprising a shatter resistant plastic. In some aspects, the plastic housing comprises a printable plastic.

In some aspects, the current method also comprises printing the plastic housing using a 3D printer.

In some aspects, the 3-D printer is a fused deposition modeling (FDM). In some aspects, the printing comprises printing with PLA (for applications in which the operating temperature does not exceed 50° C.). In some aspects, the printing comprises printing with ABS for applications in which the operating temperature is between 50° C. and 100° C.

In some aspects of the method disclosed herein, the phosphorescent material is selected from R600, R620, R630, R640, R650, R660, R675, R01, and R675. In some aspects, the layer of the dry phosphorescent material and the layer of the neutral density filter are sized to have approximately the same length and width.

In some aspects of the present disclosure the device or the method the dry phosphorescent material has a highly uniform surface.

In some aspects of the present disclosure the dry calibration slides provide calibration data having reduced inter-site variation and higher inter-site reproducibility compared to a wet calibration method. In some aspects, the inter-site variation is less than 10%.

BRIEF DESCRIPTION OF THE FIGURES

FIG. 9A shows pre-calibration integration times for three dry phosphorescent calibration slides across eight sites in point-of-care fluorescence reader 1.

FIG. 9B shows pre-calibration integration times for three dry phosphorescent calibration slides across eight sites in point-of-care fluorescence reader 2.

FIG. 9C shows pre-calibration integration times for three dry phosphorescent calibration slides across eight sites in point-of-care fluorescence reader 3.

FIG. 9D shows post-calibration integration times for three dry phosphorescent calibration slides across eight sites in point-of-care fluorescence reader 1.

FIG. 9E shows post-calibration integration times for three dry phosphorescent calibration slides across eight sites in point-of-care fluorescence reader 2.

FIG. 9F shows post-calibration integration times for three dry phosphorescent calibration slides across eight sites in point-of-care fluorescence reader 3.

DETAILED DESCRIPTION

Figure 1A:
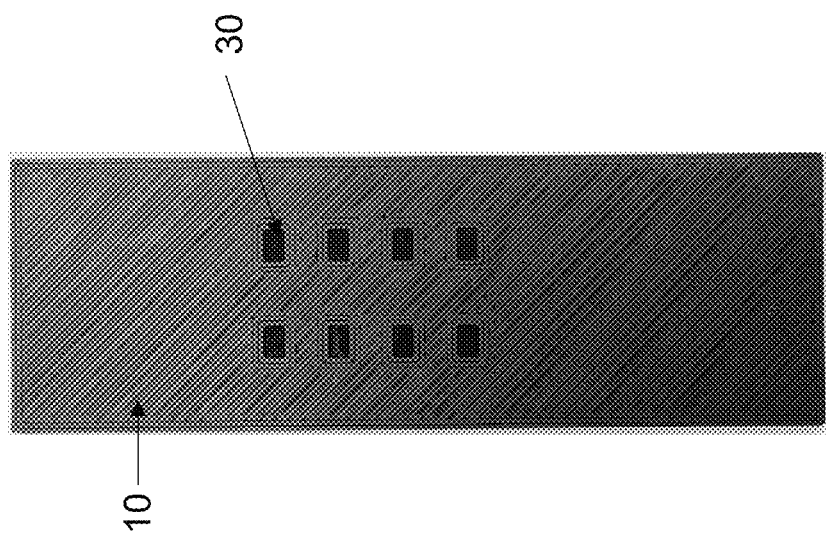
FIG. 1A shows a photograph of an example dry calibration slide comprising a two-piece plastic housing 10, with a phosphorescent sheet 20 (not visible), stack of neutral density filters 30.

The present disclosure encompasses devices and methods that can be used for calibration of fluorescent detectors. The disclosure is based on the surprising result that dry calibration slides comprising defined phosphorescent materials in combination with neutral density filters can be effectively used to calibrate fluorescence instruments. These slides do not require multiple fluorescent dyes and are not subject to photo-bleaching making them an ideal replacement for the commonly used wet calibration slides. In some aspects, the current disclosure provides calibration slides with high photostability and long shelf life for fluorescence detection instruments and process of making and using them.

I. Devices

One aspect of the present disclosure encompasses devices that can be used for calibration of fluorescent detectors. In some aspects the device may be part of a calibration kit with instructions of use. In some aspects of the present disclosure the device encompasses dry calibration slides for accurate calibration of fluorescent detectors. In some aspects, the dry calibration slides disclosed herein do not comprise a fluorophore. In some aspects, use of the slides provided herein significantly improves consistency of interpretation of input signal, thus decreasing inter-reader and intra-reader variation over the currently available state-of-the-art.

In some aspects, the current disclosure encompasses a device for performing dry calibration of a fluorescence detector. In some aspects, the device comprises a calibration slide comprising a first layer comprising a dry phosphorescent material 20 positioned adjacent to a second layer comprising a neutral density filter 30, and a housing 10 containing the first and second layers. In some aspects, the first layer and the second layer are stacked with respect to each other.

In some aspects, the slides disclosed herein have the dimension of about 75.6 mm×25 mm×1 mm, like that of a standard microscope glass slide. In some aspects, the slides may comprise a housing. In some aspects, the housing comprises at least two portions each comprising a plastic material, the two portions configured to reversibly engage one another to form the housing. In some aspects the housing may be made of a plastic, a polymer, a biodegradable substance, a non-biodegradable substance, a natural material or a synthetic material. In some aspects the housing material is a shatter resistant material. In some aspects the material may be a plastic commonly used for fused deposition modeling 3D printing including but not limited to polylactide (PLA), acrylonitrile butadiene styrene (ABS), polyethylene terephthalate glycol (PETG), nylon, thermoplastic urethane, polyvinyl alcohol, high impact polystyrene (HIPS), or a composite comprising carbon fiber, Kevlar, or fiberglass. In some other aspects the housing material may be a material commonly used for Stereolithography (SLA) 3D printing. Non-limiting examples of such materials include standard resins, draft resins, draft resins, tough and durable resins, high temperature resins, rigid resins, ceramic resins or jewelry resins. In some aspects the housing material may be a material used with Selective Laser Sintering 3D printing including but not limited to Nylon 11, Nylon 12, TPU or Nylon composites. In some aspects of the current disclosure, the housing defines at least one or a plurality of apertures there through, wherein each aperture aligns with a calibration site of the fluorescence detector. In some aspects, the housing aperture size (diameter) is selected to modulate light intensity, wherein light intensity is modulated by increasing or decreasing the aperture diameter.

In some aspects the dry calibration slides further comprises a dry phosphorescent material (20) characterized by the ability to reproduce a Stokes-shifted light emission associated with a selected fluorophore. The dry phosphorescent material mimics the selected fluorophore by absorbing light emitted by an LED of the fluorescence detector and emitting light that passes through the emission filter of the fluorescence detector.

In some aspects, any phosphorescent material pertaining to the ultraviolet, visible light, or infrared regions of the electromagnetic spectrum may be used. In some aspects phosphorescent material with peak wavelength ranging from about 200 nm to about 1500 nm may be used. In some aspects use of phosphorescent material with peak wavelength of 200 nm, 300 nm, 400 nm, 500 nm, 600 nm, 700 nm, 800 nm, 900 nm, 1000 nm, 1100 nm, 1200 nm, 1300 nm 1400 nm or 1500 nm or intermediate wavelengths is consistent with the current disclosure. In some aspects, the peak wavelength of the phosphorescent material is selected based on application or the intended use of the fluorescence reader. For example, a G540 phosphorescent material may be used in the calibration slide to calibrate a point-of-care fluorescence reader used for detection of COVID. In some aspects, R675 phosphorescent material may be used in the calibration slide to calibrate a point-of-care fluorescence reader used for detection of HPV.

In some aspects, the phosphorescent material can be crafted from any number of phosphorescent materials known in the art. In some aspects the phosphorescent material is obtained from commercially available films including but not limited to Nitrides or KSF type Phosphor sheets including R620, R630, R640, R650, R660, R675, R01. In some aspects the Phosphorescent material is cut from a sheet previously tested for uniformity. In aspect the phosphorescent material is photostable. Phosphor sheets including but not limited to R675 PhosphorTech film and R660 PhosphorTech film are available, for example from the PhosphorTech Corporation of Kennesaw, Georgia.

In some aspects the dry calibration slides further comprises one or more neutral density filters (30) capable of simulating different fluorophore concentrations by the choice of stops of light reduction. In some aspects, neutral density filters, such as absorptive, metallic, or other type of neutral density filter, may be used for reducing the amount of light that is allowed to pass through. The amount of light reduction may depend upon what is referred to as the density of the filter, for instance, as the density increases the amount of light allowed to pass through decreases. In some aspects the neutral density filters may have stops of light reductions numbers varying from 0, 1, 2, 3, 4, 5, 6, 7, 8, 9, 10, 11, 12, 13, 14, 15, 16, 17, 18, 19, 20, 22, 24. The neutral density filter may additionally include a density gradient. In some aspects the neutral density filter is configured to modulate light intensity by modifying (increasing) the stops of light reduction. In some aspects, the neutral density filter is configured to increase the stops of light reduction by a predetermined factor and thereby decrease light intensity by a corresponding predetermined factor.

In some aspects, the dry calibrations slides further comprise one or a plurality of apertures that align with interrogation sites of the fluorescence detector. The apertures prevent crosstalk and serve as a secondary method of manipulating light intensity; light intensity can be increased by increasing aperture size and vice versa. In some aspects, the calibration slides provided herein can be advantageously used in any type of microscope or fluorescent monitoring system that is suitable for slide imaging. For instance, the invention encompasses line-based scanning as well as tile based scanning microscopes. In some aspects, the calibration slides may be used with a calibration system comprising a storage unit and a processing unit. The storage unit is configured to store predetermined standard calibration data of at least one fluorescence channel. The processing unit is configured to compare the acquired calibration test data with the stored predetermined standard calibration data to generate an intensity correction profile of the at least one fluorescence channel. The intensity correction profile is provided for correcting fluorescence image data of a fluorescent sample obtained with the fluorescence microscope for the at least one fluorescence channel.

The calibration system may be an integral part of the fluorescence microscope. Alternatively, the calibration system may be a computer.

Different fluorescent monitoring systems may be used with the various aspects of this disclosure. Non-limiting examples of fluorescence instrument that may be used to practice this invention may include, cytometric measurement device systems, flow cytometric systems, lateral flow assay systems (LFA), loop-mediated isothermal amplification systems (LAMP), microfluidic systems, confocal microscopes, or epifluorescence microscopes. Methods of performing assays on fluorescent materials are well known in the art and are described in, e.g., Lakowicz, J. R., Principles of Fluorescence Spectroscopy, New York: Plenum Press (1983); Herman, B., Resonance energy transfer microscopy, in: Fluorescence Microscopy of Living Cells in Culture, Part B, Methods in Cell Biology, vol. 30, ed. Taylor, D. L. & Wang, Y.-L., San Diego: Academic Press (1989), pp. 219-243; Turro, N.J., Modern Molecular Photochemistry, Menlo Park: Benjamin/Cummings Publishing Col, Inc. (1978), pp. 296-361. The fluorescent monitoring systems may include different types of fluorescent detectors depending on the labels and assays. In some aspects the detector may be a multiplexed, point-of-care fluorescence detector. These detectors may comprise appropriate sensitivity systems including but not limited to photomultiplier tubes (PMT), charged coupled detectors (CCDs), avalanche photodiodes. In some aspects, detectors may include a flow cytometer or microscope with one or more channels of detection; photomultiplier tubes (PMT) to detect and amplify the signal from photons and convert the signal into an electric current; avalanche photodiodes, charged coupled detectors (CCD) cameras to capture and transform data and images into quantifiable formats; and a computer workstation. In some aspects the detector may contain a 4×2 array of interrogation sites positioned in the transmission mode configuration.

II. Methods for Calibration

Another aspect of the present disclosure provides methods for performing calibration of a fluorescence detector with respect to a fluorophore, using the disclosed dry calibration slides. The method comprises obtaining or having obtained a dry calibration slide for each of a plurality of pre-selected calibration sites, each dry calibration slide characterized by differing stops of light reduction compared to the other dry calibration slides generating a calibration curve for each calibration site using one of the dry calibration slides for each calibration site, using varying light intensities within a dynamic range of the fluorescence detector to collect the calibration curve data, plotting integration times against stops of light reduction for each calibration site and using the plot generated in to calibrate each site in the fluorescence detector to determine a fluorophore concentration that results in equal reported fluorescence intensities across all sites.

In a further aspect, the method provides reducing output variation in fluorescence readers. The method comprises using dry calibration slides, each characterized by differing stops of light reduction, and generating calibration curve as a function of integration time and stops of light reduction at different sites within a fluorescence reader. The calibration curve thus generated can be used to calibrate sites across a fluorescence reader, for reducing output variation within a fluorescence reader.

The method further comprises reducing output variation between fluorescence readers. The method comprises using dry calibration slides, each characterized by differing stops of light reduction, and generating calibration curve as a function of integration time and stops of light reduction at different sites across multiple fluorescence readers. The calibration curve thus generated can be used to calibrate sites between different fluorescence readers, for reducing output variation across multiple fluorescence readers.

In some aspects, the calibration slides used in the disclosed method depend on the instrument to be calibrated and the proposed use. In some aspects of the disclosed method, phosphorescent material of the dry calibration slide is selected based upon the excitation and emission characteristics of the selected fluorophore, and the optical configuration of the fluorescence detector. In some aspects, the dry phosphorescent material mimics the selected fluorophore by absorbing light emitted by an LED of the fluorescence detector and emitting light that passes through the emission filter of the fluorescence detector. In some aspects, the slide may correspond to one or more than one channel corresponding to a dye or wavelength of interest.

Different fluorescent monitoring systems may be used with the various aspects of this disclosure. Non-limiting examples of fluorescence instrument that may be used to practice this invention may include, cytometric measurement device systems, flow cytometric systems, lateral flow assay systems (LFA), loop-mediated isothermal amplification systems (LAMP), microfluidic systems, confocal microscopes, or epifluorescence microscopes. Methods of performing assays on fluorescent materials are well known in the art and are described in, e.g., Lakowicz, J. R., Principles of Fluorescence Spectroscopy, New York: Plenum Press (1983); Herman, B., Resonance energy transfer microscopy, in: Fluorescence Microscopy of Living Cells in Culture, Part B, Methods in Cell Biology, vol. 30, ed. Taylor, D. L. & Wang, Y.-L., San Diego: Academic Press (1989), pp. 219-243; Turro, N.J., Modern Molecular Photochemistry, Menlo Park: Benjamin/Cummings Publishing Col, Inc. (1978), pp. 296-361.

The fluorescent monitoring systems may include different types of fluorescent detectors depending on the labels and assays. In some aspects the detector may be a multiplexed, point-of-care fluorescence detector. These detectors may comprise appropriate sensitivity systems including but not limited to photomultiplier tubes (PMT), charged coupled detectors (CCDs), avalanche photodiodes. In some aspects, detectors may include a flow cytometer or microscope with one or more channels of detection; photomultiplier tubes (PMT) to detect and amplify the signal from photons and convert the signal into an electric current; avalanche photodiodes, charged coupled detectors (CCD) cameras to capture and transform data and images into quantifiable formats; and a computer workstation. In some aspects the detector may contain a 4×2 array of interrogation sites positioned in the transmission mode configuration.

In some aspects, the dry calibration slide can be used for determining or measuring intra-reader variation. The method comprises using dry calibration slides, each characterized by differing stops of light reduction, and generating mean integration times for multiple stops of light reduction at different sites within a fluorescence reader. The intra-reader variation can be determined by calculating the coefficient of variation for each dry calibration slide across the different sites within a reader. Based on the determined coefficient of variation, the fluorescence reader can be calibrated to achieve a desired consistency of reading.

In some aspects, the dry calibration slide can be used for determining or measuring inter-reader variation. The method comprises using dry calibration slides, each characterized by differing stops of light reduction, and generating mean integration time for stops of light reduction at a given site across multiple fluorescence readers. The inter-reader variation can be determined by calculating the coefficient of variation for each dry calibration slide at each of the given sites across multiple fluorescence readers. Based on the determined coefficient of variation, the fluorescence readers can be calibrated to achieve a desired consistency of reading at each of the given sites across multiple fluorescence readers.

In some aspects, the method provides reducing variation of output for a calibration slide between fluorescence readers. The method comprises using dry calibration slides, each characterized by differing stops of light reduction, and generating calibration curve as a function of integration time and stops of light reduction at different sites across multiple fluorescence readers. The calibration curve, then can be used to calibrate sites within fluorescence readers, to achieve a reduced output variation of a calibration slide, across multiple fluorescence readers.

In some aspects, the method provides increases consistency of integration times across multiple sites within a fluorescence reader. The method comprises using dry calibration slides, each characterized by differing stops of light reduction, and generating calibration curve as a function of integration time and stops of light reduction at different sites within a fluorescence reader. The calibration curve thus generated can be used to calibrate sites across a fluorescence reader, for achieving increased consistency of integration times across multiple sites with a fluorescence reader.

In some aspects, the method provides increased consistency of a calibration slide across fluorescence readers. The method comprises using dry calibration slides, each characterized by differing stops of light reduction, and generating calibration curve as a function of integration time and stops of light reduction at different sites across multiple fluorescence readers. The calibration curve, then can be used to calibrate sites within fluorescence readers for achieving increased consistency of integration time of a calibration slide, across multiple fluorescence readers.

In some aspects, the method provides reducing output variation across sites within a fluorescence reader and between sites across multiple fluorescence readers. The output variation across sites within a fluorescence reader can be reduced by 12% or 11% or 10% or 9% or 8% or 7% or 6% or 5% or 4% or 3% or 2% or 1% or less than 1%. The output variation between sites across multiple fluorescence readers can be reduced by 12% or 11% or 10% or 9% or 8% or 7% or 6% or 5% or 4% or 3% or 2% or 1% or less than 1%.

In some aspects, one or more attribute is improved by the use of the disclosed dry calibration slide. In some aspects, the consistency of the interpretation of input signal is increased or improved. In some aspects, calibration using the dry calibration slide reduces, minimizes or eliminates the variation in output across multiple sites in a fluorescence reader for a given input. In some aspect, calibration using the dry calibration slide reduces, minimizes, or eliminates the variation across various fluorescence readers for a given input. In some aspects, calibration using dry calibration slide reduces, minimizes, or eliminates the variation observed over time in a fluorescence reader. In some aspects, the dry calibration slide is used for drift correction in a fluorescence reader. In some aspects, the dry calibration slide improves or increases the consistency of the results from fluorescence reader over multiple sessions and/or use over time. In some aspects, inter-reader and intra-reader variation is reduced, minimized, or eliminated by calibration with the dry calibration slide.

III. Methods of Making a Dry Calibration Device

A further aspect of the present disclosure provides method of making the dry calibration device. In some aspects the device is manufactured by obtaining or having obtained a plastic housing having a top portion and a bottom portion defining a recess, the top and bottom portions configured to reversibly engage one another to form the housing. In some aspects the housing may be 3D-printed using any of the standard 3D-printing techniques known in the art. This may include but are not limited to fused deposition modelling (FDM), stereolithography (SLA) or selective laser sintering (SLS). In some aspects, the printing comprises printing with acrylonitrile butadiene styrene (ABS) for applications in which the operating temperature is between 50° C. and 100° C. In some aspects the housing may be molded using any of the known techniques available for molding. In some aspects the housing may be cut or carved by any other known technique.

In a further aspect of the method, a layer of one or a plurality of neutral density filters is positioned in the recess of the bottom housing portion and a layer of a selected dry phosphorescent material is stacked on top of the neutral density filter layer. In some aspects of the disclosure the dry phosphorescent material may be obtained from a film tested for uniformity of phosphorescence using any of the standard protocols known in the art. In some aspects the phosphorescent material and the neutral density filter may be pre-manufactured in a desired size. In some aspects, the phosphorescent sheet and the neutral density filter may be cut from larger sheets. In some aspects the neutral density filter and the phosphorescent sheet is of the same size. In some aspects the neutral density filter and the phosphorescent sheet are of different sizes.

In a further aspect of the disclosure the top housing top portion is positioned over the housing bottom portion and the housing bottom portion engages with the housing top portion to form the housing. In some aspects an adhesive may be applied to interior contact surfaces of either or both housing portions before engaging the housing bottom portion with the housing top portion. In some aspects an contact between the housing bottom portion with the housing top portion is secured by any other means known in the art.

IV. Kits

In some aspects, the current disclosure also encompasses a calibration kit comprising one or more dry calibration slides disclosed herein and instructions for using the same. Instructions included in the kits may be affixed to packaging material or may be included as a package insert. While the instructions are typically written or printed materials, they are not limited to such. Any medium capable of storing such instructions and communicating them to an end user is contemplated by this disclosure. Such media include, but are not limited to, electronic storage media (e.g., magnetic discs, tapes, cartridges, chips), optical media (e.g., CD ROM), and the like. As used herein, the term "instructions" may include the address of an internet site that provides the instructions.

Definitions

Unless defined otherwise, all technical and scientific terms used herein have the meaning commonly understood by a person skilled in the art to which this invention belongs. As used herein, the following terms have the meanings ascribed to them unless specified otherwise.

When introducing elements of the present disclosure or the preferred aspects(s) thereof, the articles "a", "an", "the" and "said" are intended to mean that there are one or more of the elements. The terms "comprising", "including" and "having" are intended to be inclusive and mean that there may be additional elements other than the listed elements.

The term "dry calibration" as used herein refers to calibration of fluorescent detectors without using liquid fluorophores. The current method for calibrating multiplexed fluorescence detectors requires preparation of various liquid fluorophore dilutions and pipetting them on slides. The term dry calibration does not involve these liquid fluorophores.

The term "uniform surface" as used herein means the dry phosphorescent film exhibits at least over 85% fluorescence uniformity when measured using standard methods of calculating uniformity, non-limiting examples of which are provided in Example 2.

The term "integration time" as used herein means the amount of time available to obtain a measurement during which there is essentially no change in the level of the signal.

The term "neutral density filter" or ND filter as used herein means a filter which blocks the light in a neutral way, by modifying the intensity of all wavelengths or colors equally and without changing the color of the light. An ND filter is used to darken or lower the amount of light that passes through the lens by a specified number of stops, ranging from a fraction of a stop to 10 stops or more. The term "stop of light reduction" as used herein means halving the amount of light exposure.

As used herein, the term "phosphorescent material" or "phosphorescent substance" is a material that glows when exposed to light (radiation) of a shorter wavelength, absorbing the light and reemitting it at a longer wavelength. Unlike fluorescence, a phosphorescent material does not immediately reemit the radiation it absorbs. Instead, a phosphorescent material absorbs some of the radiation energy and reemits it for a much longer time after the radiation source is removed.

As used here the term "Stokes-shifted" refers to the shift in the energy, wavenumber or frequency units between positions of the band maxima of the absorption and emission spectra. Stokes shift is characterized by the emission of a longer-wavelength photon (lower frequency or energy) by a molecule that has absorbed a photon of shorter wavelength (higher frequency or energy).

EXAMPLES

All patents and publications mentioned in the specification are indicative of the levels of those skilled in the art to which the present disclosure pertains. All patents and publications are herein incorporated by reference to the same extent as if each individual publication was specifically and individually indicated to be incorporated by reference.

The publications discussed throughout are provided solely for their disclosure before the filing date of the present application. Nothing herein is to be construed as an admission that the invention is not entitled to antedate such disclosure by virtue of prior invention.

The following examples are included to demonstrate the disclosure. It should be appreciated by those of skill in the art that the techniques disclosed in the following examples represent techniques discovered by the inventors to function well in the practice of the disclosure. Those of skill in the art should, however, in light of the present disclosure, appreciate that many changes could be made in the disclosure and still obtain a like or similar result without departing from the spirit and scope of the disclosure, therefore all matter set forth is to be interpreted as illustrative and not in a limiting sense.

Example 1. Design and Assembly of a Dry Calibration Slide

Figure 1B:
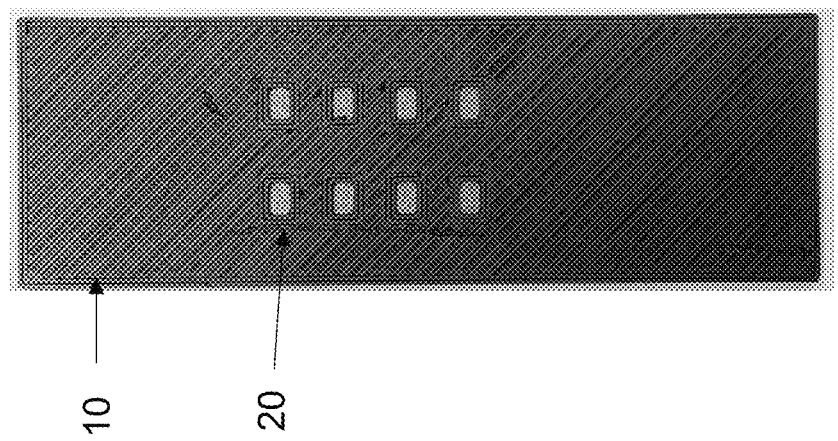
FIG. 1B shows a photograph of an example dry calibration slide comprising a two-piece plastic housing 10, a phosphorescent sheet 20 but no neutral density filters.
Figure 2A:
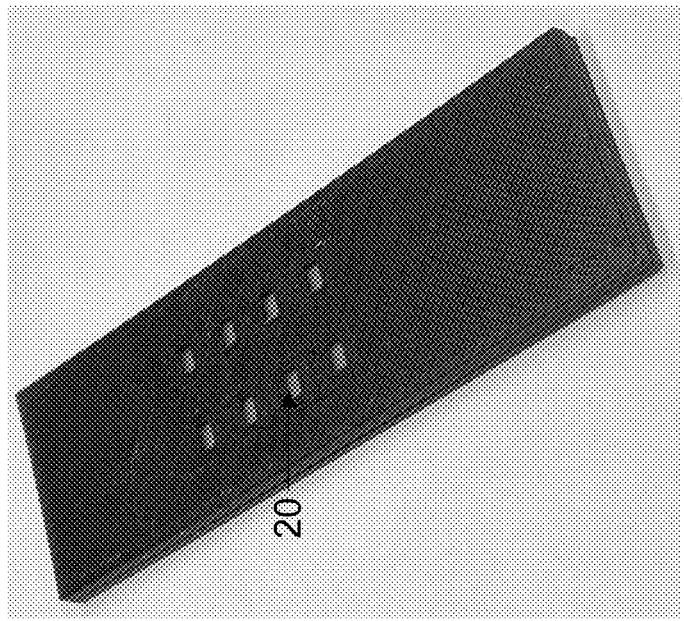
FIG. 2A shows a side view photograph of an example dry calibration slide comprising a two-piece plastic housing 10, with a phosphorescent sheet 20 (not visible), neutral density filter stack 30.
Figure 2B:
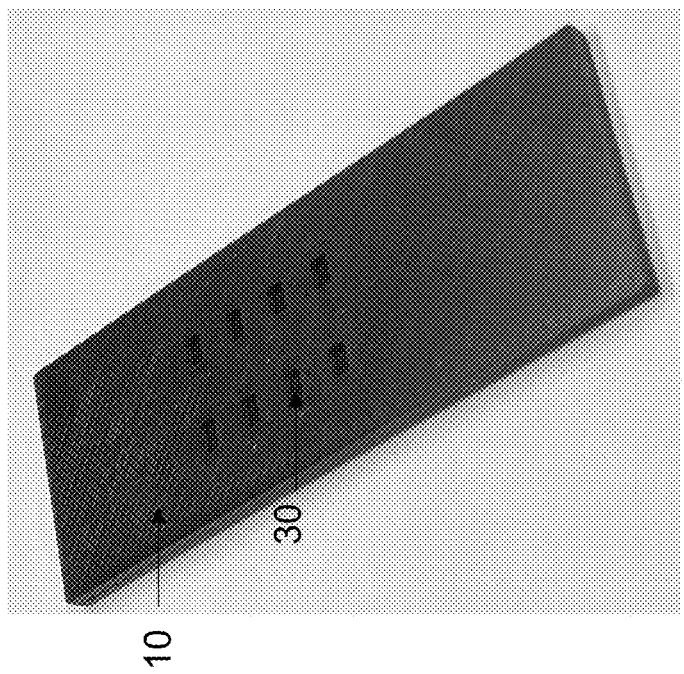
FIG. 2B shows a side view photograph of an example dry calibration slide comprising a two-piece plastic housing 10, a phosphorescent sheet 20 but no neutral density filter stack.

Multiple example dry calibration slides like those shown in FIG. 1 and FIG. 2 were assembled and used for performing test calibrations. Each fabricated calibration slide may be comprised of following components and variations thereof:

1) A two-piece plastic housing (10), fabricated using a fused deposition modeling (FDM) 3D printer. In some example slides, the plastic housing pieces were printed using polylactide (PLA) as the operating temperatures do not exceed 50° C. In some other example slides, the plastic housing pieces were printed using acrylonitrile butadiene styrene (ABS) that functions well at operating temperatures in the range of 50 C-100 C. Other non-limiting examples of materials that may be used in other renderings of this design with FDM may include polyethylene terephthalate glycol (PETG), nylon, thermoplastic urethane, polyvinyl alcohol, high impact polystyrene (HIPS), composites including carbon fiber, Kevlar, fiberglass. See above [0045] for non-limiting examples of materials that can be used with other 3D printing methods like SLA and SLS.

2) A phosphorescent sheet (20), 27 mm×19 mm in dimension, cut in this example, using a bypass trimmer from an 8.5"×11" phosphorescent sheet. In some examples tested the phosphorescent sheet was a R675 PhosphorTech film. In some other examples the phosphorescent sheet was R600 PhosphorTech film. The sheets used for the slides were characterized for determining the uniformity of fluorescence by the method outlined in Example 2. Other non-limiting examples of phosphorescent sheets that may be used in the dry calibration slides are described above.

3) A neutral density filter (30), 27 mm×19 mm in dimension, cut in this example using a bypass trimmer from a 16"×16" sheet. A set of at least three dry calibration slides with variable neutral density filter and therefore different light intensities were used for each calibration of a fluorescent detector.

Figure 3:
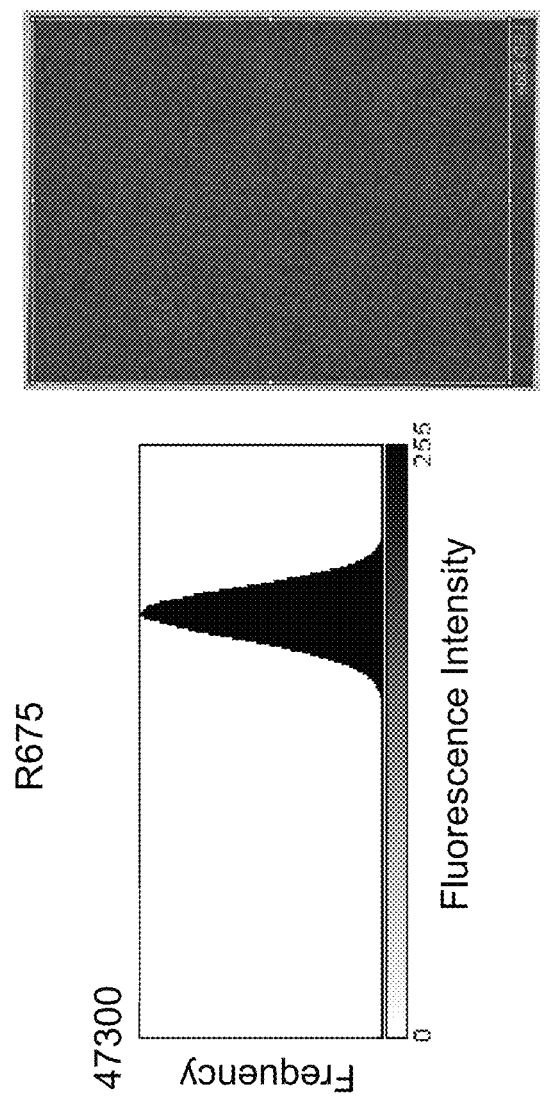
FIG. 3 shows a fluorescence intensity curve for characterization of uniformity of fluorescence for a R675 PhosphorTech film used in a calibration of slide.
Figure 4:
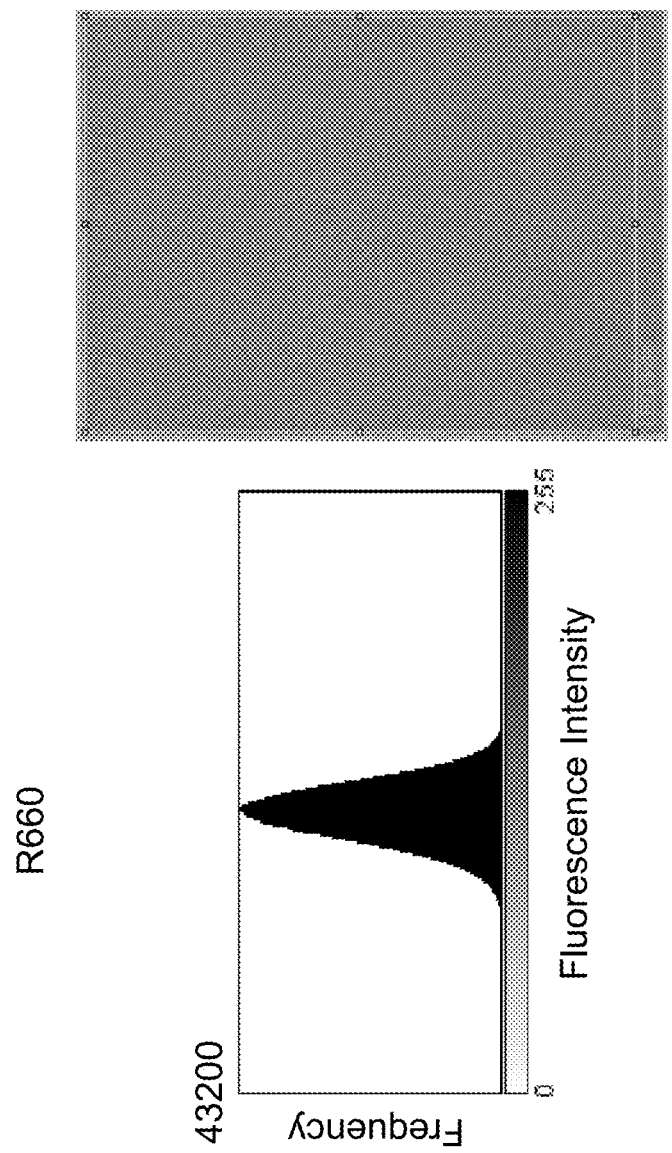
FIG. 4 shows a fluorescence intensity curve for characterization of uniformity of fluorescence for a R660 PhosphorTech film used in a calibration of slide.

The components of each of the example calibration slides were assembled as described here. The neutral density filter was placed into a 1.2 mm deep recession in the bottom of the housing piece; the piece of phosphorescent sheet was then stacked on top of the neutral density filter. Liquid adhesive was applied on the interior contact surfaces of the bottom housing piece; the top housing piece was then placed on top and the two pieces were pressed together to complete the construction of each of the example dry calibration slide. In this configuration the dry calibrations slides were configured to have one or more apertures that align with interrogation sites of the fluorescence detector. The apertures prevent crosstalk and serve as a secondary method of manipulating light intensity; light intensity can be increased by increasing aperture size and vice versa Example 2. Characterization of the Uniformity of Phosphorescent Film Used of Calibration of Multiplexed Detector The R675 and R660 Phosphor Tech phosphorescent films were tested for uniformity of fluorescence. Each phosphor came from PhosphorTech in an 8"×11" sheet. The films were excited using a 532 nm (green) light source (LED, though other light sources such as laser may be used) with a 670/30 (transmits wavelengths between 655 nm and 685 nm) bandpass filter. The films were scanned using a GE Typhoon Trio+fluorescence scanner. Emission data was analyzed on an 8-bit greyscale (0-255) in ImageJ to obtain fluorescence intensity values for each pixel. They fluorescent intensity curves for R675 and R660 are shown in FIGS. 3 and 4 respectively and characteristics are as tabulated below in Table 1.

TABLE 1

| Fluorescent intensity measurements | | |
|---|---|---|
| | R675 | R660 |
| Mean | 182.4 (71.5% of maximum intensity) | 118.6 (46.5% of maximum intensity) |
| Standard Deviation | 11.1 (6.1%) | 12.3 (10.4%) |
| Range | 123 (125-248) | 140 (51-191) |
| Pixel count | 1,319,633 | 1,325,646 |

The calculation of uniformity of phosphorescent film is non-trivial and has various definitions depending on the statistical parameter used. Uniformity was therefore calculated using different methods provided below:

i) The method based on standard deviation defines uniformity as:

$$U = \left(1 - \frac{\sigma}{\bar{x}}\right) * 100\%,$$

such that U is uniformity, $\sigma$ is the standard deviation, and $\bar{x}$ is the mean ii) The method based on average distance to the mean defines uniformity as:

$$U = \left(1 - \frac{d_{avg}}{\bar{x}}\right) * 100\%,$$

such that U is uniformity, davg is the average distance to the mean, and $\bar{x}$ is the mean iii) The method based on average of the lower quartile defines uniformity as:

$$U = \frac{avg_{LQ}}{\bar{x}} * 100\%,$$

such that u is uniformity, $avg_{LQ}$ is the average of the lowest quartile, and $\bar{x}$ is the mean The table below (Table 2) shows the fluorescence uniformity values calculated using each of the three methods for both sheets.

TABLE 2

Fluorescence Uniformity of Phosphor Films

| Method | Phosphor Film | |
| --- | --- | --- |
| | R675 | R660 |
| $\sigma$ | 93.9% | 89.6% |
| $d_{avg}$ | 95.1% | 91.8% |
| $avg_{LQ}$ | 91.7% | 86.3% |

Figure 5:
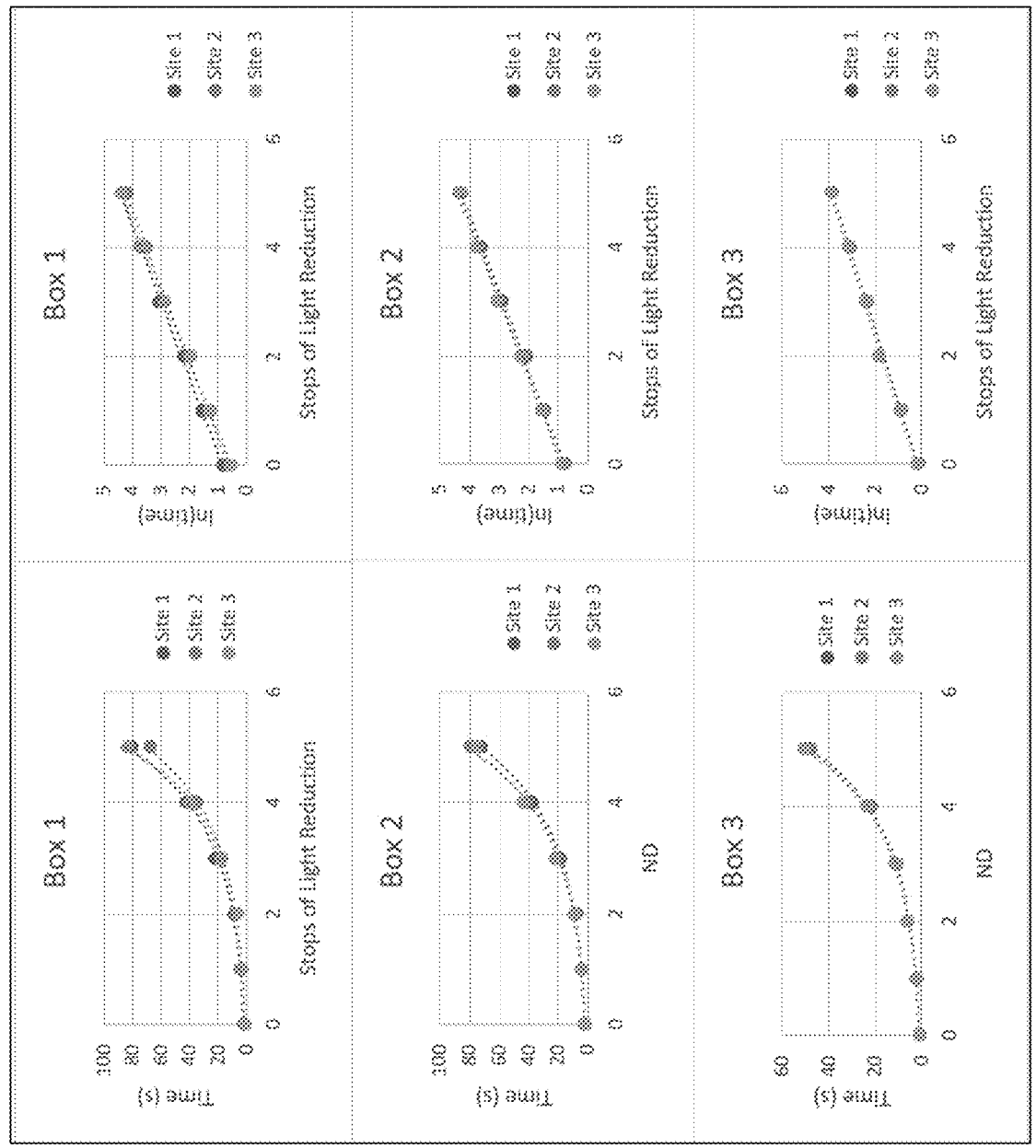
FIG. 5 shows calibration curves corresponding to sites 1-3 of the multiplexed fluorescence detector using 3 dry calibration slides each with varying light intensities.
Figures 6A, 6B:
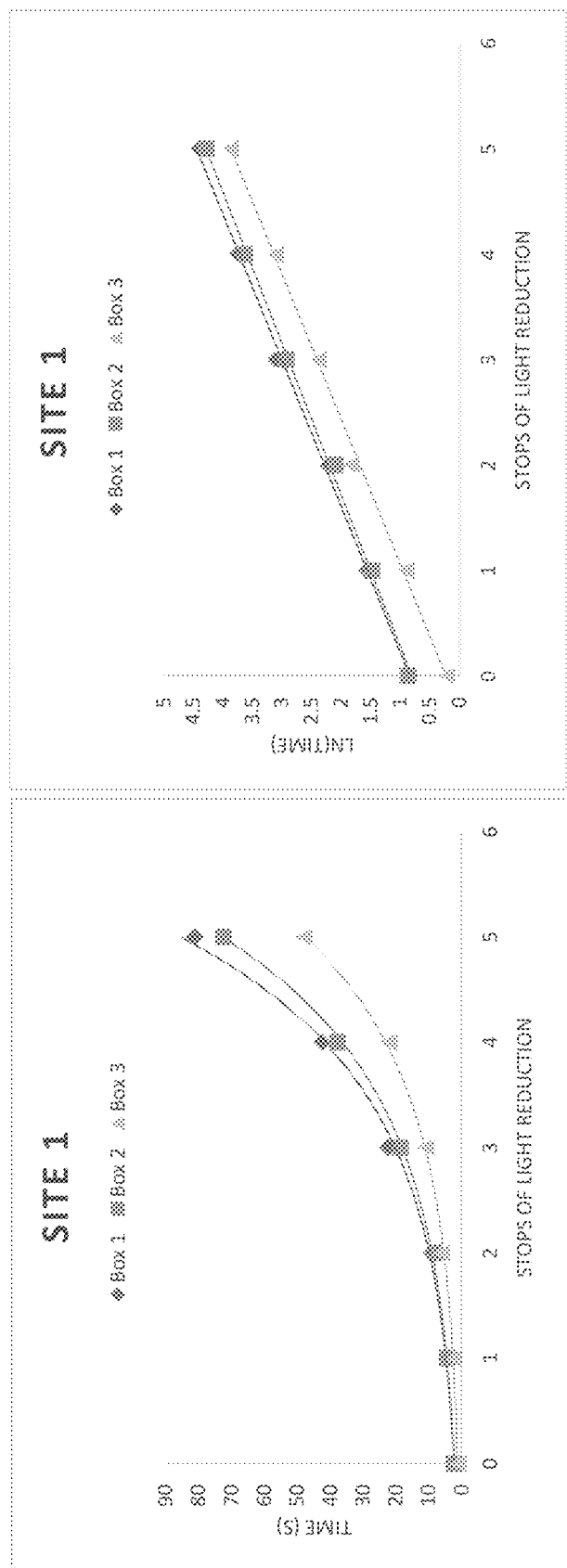
FIG. 6A shows calibration curves at site 1 corresponding to Box 1-3 of the multiplexed fluorescence detector using 3 dry calibration slides each with varying light intensities.
FIG. 6B shows trendline error at site 1 corresponding to Box 1-3 of the multiplexed fluorescence detector using 3 dry calibration slides each with varying light intensities.
Figures 6C, 6D:
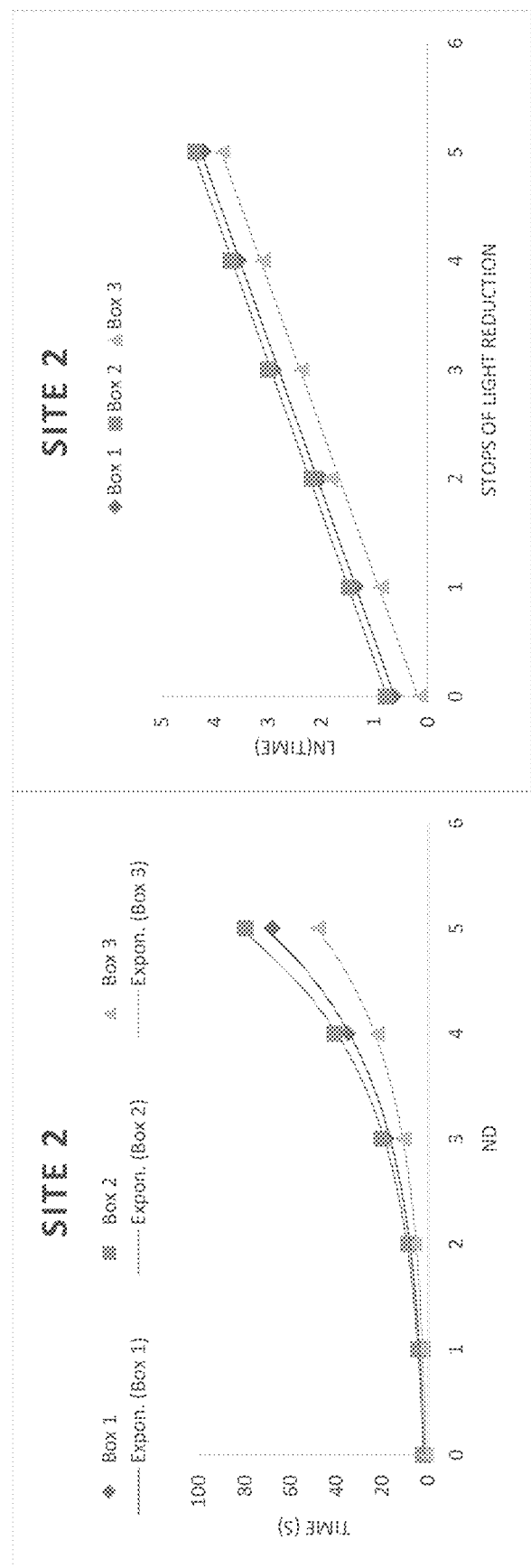
FIG. 6C shows calibration curves at site 2 corresponding to Box 1-3 of the multiplexed fluorescence detector using 3 dry calibration slides each with varying light intensities.
FIG. 6D shows trendline error at site 2 corresponding to Box 1-3 of the multiplexed fluorescence detector using 3 dry calibration slides each with varying light intensities.
Figures 6E, 6F:
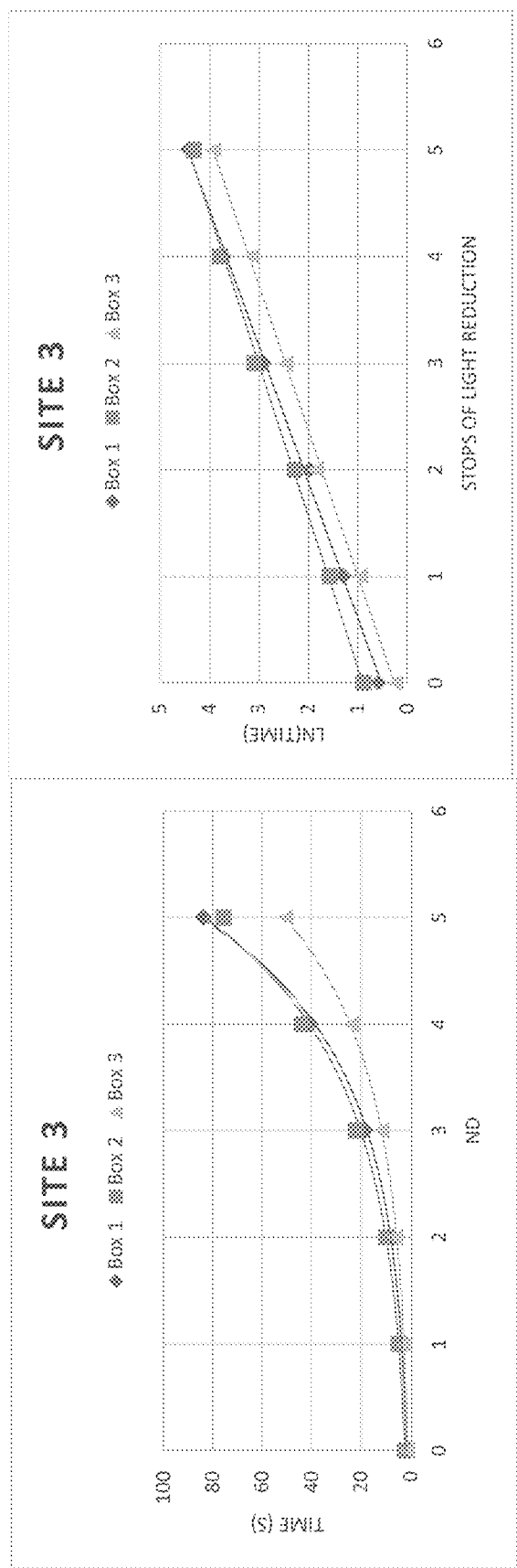
FIG. 6E shows calibration curves at site 3 corresponding to Box 1-3 of the multiplexed fluorescence detector using 3 dry calibration slides each with varying light intensities.
FIG. 6F shows trendline error at site 3 corresponding to Box 1-3 of the multiplexed fluorescence detector using 3 dry calibration slides each with varying light intensities.

Example 3: Calibration of Fluorescent Emission Detectors Using the Dry Calibration Technique Dry calibration slides comprising the R675 film with varying stops of light reduction were used in the fluorescence detector to generate a calibration curve for each site. Three dry calibration slides of varying light intensities that fall within the dynamic range of the detector were used to collect data. The variation in light intensities was achieved using different neutral density filters. Integration times were plotted vs. stops of light reduction for each site. FIG. 5 provides the calibration curves for each of the sites and the data is presented in Table 3. This information was then used to calibrate each site in the fluorescence detector so that a specific fluorophore concentration will result in equal reported fluorescence intensities across all sites.

TABLE 3

Integration times vs. stops of light reduction for each Box

| | Box 1 | | | Box 2 | | | Box 3 | | |
| --- | --- | --- | --- | --- | --- | --- | --- | --- | --- |
| Stops | Site 1 | Site 2 | Site 3 | Site 1 | Site 2 | Site 3 | Site 1 | Site 2 | Site 3 |
| | Integration Time | | | | | | | | |
| 0 | 2.33 | 1.88 | 1.8 | 2.4 | 2.2 | 2.43 | 1.23 | 1.15 | 1.27 |
| 1 | 4.78 | 3.87 | 3.67 | 4.4 | 4.4 | 4.86 | 2.47 | 2.41 | 2.6 |
| 2 | 9.26 | 7.5 | 7.16 | 8.12 | 8.85 | 9.72 | 6.3 | 6.3 | 6.42 |
| 3 | 22.48 | 18.26 | 18.48 | 18.72 | 20.43 | 22.15 | 10.85 | 10.88 | 11.68 |
| 4 | 42.62 | 35.23 | 40.72 | 37.86 | 41.17 | 44.22 | 22.2 | 22.36 | 23.65 |
| 5 | 81.34 | 68.25 | 83.9 | 72.71 | 79.98 | 75.7 | 47.93 | 48.26 | 50.49 |
| | Natural Log | | | | | | | | |
| 0 | 0.845868 | 0.631272 | 0.587787 | 0.875469 | 0.788457 | 0.887891 | 0.207014 | 0.139762 | 0.239017 |
| 1 | 1.564441 | 1.353255 | 1.300192 | 1.481605 | 1.481605 | 1.581038 | 0.904218 | 0.879627 | 0.955511 |
| 2 | 2.225704 | 2.014903 | 1.96851 | 2.09433 | 2.180417 | 2.274186 | 1.84055 | 1.84055 | 1.859418 |
| 3 | 3.112626 | 2.904713 | 2.916689 | 2.929592 | 3.017004 | 3.097837 | 2.384165 | 2.386926 | 2.457878 |
| 4 | 3.752324 | 3.561898 | 3.706719 | 3.633895 | 3.71771 | 3.789177 | 3.100092 | 3.107274 | 3.163363 |
| 5 | 4.398638 | 4.223177 | 4.429626 | 4.286479 | 4.381777 | 4.326778 | 3.869742 | 3.876603 | 3.921775 |
| Nitrocellulose | 60.52 | 60.63 | 59.75 | 60.49 | 59.9 | 60.5 | 60.16 | 60.49 | 60.37 |

The data was benchmarked against calibrations for the same sites using wet calibration techniques. Briefly, all 8 sites in each box/reader were set to integrate in 20+/−0.5 seconds for a blank wet calibration slide. A wet calibration slide with a fluorophore concentration of 1:100 was then interrogated in the box. The results show that calibrating the readers with a blank wet calibration slide does not yield consistent results across all sites. The data is provided in Table 4 and corresponding plots are shown in FIGS. 6A-6F.

TABLE 4

Wet calibration data for 8 sites

| | | | Site # | | | | | | | |
| --- | --- | --- | --- | --- | --- | --- | --- | --- | --- | --- |
| Intra | | | 1 | 2 | 3 | 4 | 5 | 6 | 7 | 8 |
| Box 1 | Blank | 1 | 19.92 | 19.62 | 20.09 | 20.20 | 19.59 | 19.80 | 19.72 | 19.85 |
| | | 2 | 19.89 | 19.63 | 20.10 | 20.24 | 19.59 | 19.77 | 19.72 | 19.88 |
| | | 3 | 19.89 | 19.63 | 20.10 | 20.22 | 19.63 | 19.81 | 19.72 | 19.84 |
| | | AVG | 19.90 | 19.63 | 20.10 | 20.22 | 19.60 | 19.79 | 19.72 | 19.86 |
| | | STD | 0.02 | 0.01 | 0.01 | 0.02 | 0.02 | 0.02 | 0.00 | 0.02 |
| | | STD % | 0.09 | 0.03 | 0.03 | 0.10 | 0.12 | 0.11 | 0.00 | 0.10 |
| | 1:100 | 1 | 10.76 | 9.68 | 9.41 | 7.86 | 7.79 | 7.98 | 8.63 | 9.82 |
| | | 2 | 10.82 | 9.66 | 9.4 | 7.81 | 7.25 | 7.94 | 8.59 | 9.78 |
| | | 3 | 10.78 | 9.66 | 9.41 | 7.83 | 7.59 | 7.97 | 8.61 | 9.8 |
| | | AVG | 10.79 | 9.67 | 9.41 | 7.83 | 7.54 | 7.96 | 8.61 | 9.80 |
| | | STD | 0.03 | 0.01 | 0.01 | 0.03 | 0.27 | 0.02 | 0.02 | 0.02 |
| Box 2 | Blank | 1 | 20.15 | 20.15 | 19.78 | 19.79 | 20.14 | 20.45 | 19.87 | 20.23 |
| | | 2 | 20.18 | 20.15 | 19.78 | 19.8 | 20.15 | 20.5 | 19.88 | 20.29 |
| | | 3 | 20.19 | 20.17 | 19.79 | 19.81 | 20.18 | 20.54 | 19.90 | 20.34 |

TABLE 4-continued

Wet calibration data for 8 sites

| Intra | | | Site # | | | | | | | |
|---|---|---|---|---|---|---|---|---|---|---|
| | | | 1 | 2 | 3 | 4 | 5 | 6 | 7 | 8 |
| | | AVG | 20.17 | 20.16 | 19.78 | 19.80 | 20.16 | 20.50 | 19.88 | 20.29 |
| | | STD | 0.02 | 0.01 | 0.01 | 0.01 | 0.02 | 0.05 | 0.02 | 0.06 |
| | | STD % | 0.10 | 0.06 | 0.03 | 0.05 | 0.10 | 0.22 | 0.08 | 0.27 |
| | 1:100 | 1 | 9.33 | 9.18 | 9.11 | 9.58 | 9.18 | 7.71 | 8.84 | 8.11 |
| | | 2 | 9.34 | 9.21 | 9.13 | 9.6 | 9.19 | 7.73 | 8.85 | 8.13 |
| | | 3 | 9.37 | 9.22 | 9.15 | 9.61 | 9.21 | 7.75 | 8.87 | 8.14 |
| | | AVG | 9.35 | 9.20 | 9.13 | 9.60 | 9.19 | 7.73 | 8.85 | 8.13 |
| | | STD | 0.02 | 0.02 | 0.02 | 0.02 | 0.02 | 0.02 | 0.02 | 0.02 |
| | | STD % | 0.22 | 0.23 | 0.22 | 0.16 | 0.17 | 0.26 | 0.17 | 0.19 |
| Box 3 | Blank | 1 | 19.89 | 19.88 | 19.59 | 19.99 | 20.24 | 19.68 | 20.25 | 20.18 |
| | | 2 | 19.62 | 19.63 | 19.46 | 19.92 | 20.27 | 19.77 | 20.39 | 20.24 |
| | | 3 | 19.32 | 19.41 | 19.39 | 19.74 | 20.19 | 19.75 | 20.33 | 19.85 |
| | | AVG | 19.61 | 19.64 | 19.48 | 19.88 | 20.23 | 19.73 | 20.32 | 20.09 |
| | | STD | 0.29 | 0.24 | 0.10 | 0.13 | 0.04 | 0.05 | 0.07 | 0.21 |
| | | STD % | 1.45 | 1.20 | 0.52 | 0.65 | 0.20 | 0.24 | 0.35 | 1.05 |
| | 1:100 | 1 | 7.92 | 7.66 | 8.12 | 7.32 | 8.91 | 7.31 | 8.27 | 9.32 |
| | | 2 | 7.94 | 7.67 | 8.14 | 7.33 | 8.9 | 7.3 | 8.29 | 9.25 |
| | | 3 | 7.94 | 7.69 | 8.15 | 7.32 | 8.87 | 7.3 | 8.3 | 9.28 |
| | | AVG | 7.93 | 7.67 | 8.14 | 7.32 | 8.89 | 7.30 | 8.29 | 9.28 |
| | | STD | 0.01 | 0.02 | 0.02 | 0.01 | 0.02 | 0.01 | 0.02 | 0.04 |
| | | STD % | 0.15 | 0.20 | 0.19 | 0.08 | 0.23 | 0.08 | 0.18 | 0.38 |
| Box 4 | Blank | 1 | 19.84 | 20.19 | 19.94 | 20.32 | 20.29 | 20.18 | 20.29 | 19.66 |
| | | 2 | 19.78 | 20.39 | 19.87 | 20.23 | 20.39 | 20.3 | 20.4 | 19.87 |
| | | 3 | 19.8 | 20.48 | 19.91 | 20.29 | 20.53 | 20.45 | 20.52 | 20.22 |
| | | AVG | 19.81 | 20.35 | 19.91 | 20.28 | 20.40 | 20.31 | 20.40 | 19.92 |
| | | STD | 0.03 | 0.15 | 0.04 | 0.05 | 0.12 | 0.14 | 0.12 | 0.28 |
| | | STD % | 0.15 | 0.73 | 0.18 | 0.23 | 0.59 | 0.67 | 0.56 | 1.42 |
| | 1:100 | 1 | 4.66 | 3.18 | 5.73 | 5.60 | 4.30 | 3.82 | 3.73 | 4.18 |
| | | 2 | 4.68 | 3.19 | 5.73 | 5.63 | 4.30 | 3.83 | 3.73 | 4.18 |
| | | 3 | 4.69 | 3.18 | 5.74 | 5.63 | 4.32 | 3.84 | 3.74 | 4.18 |
| | | AVG | 4.68 | 3.18 | 5.73 | 5.62 | 4.31 | 3.83 | 3.73 | 4.18 |
| | | STD | 0.02 | 0.01 | 0.01 | 0.02 | 0.01 | 0.01 | 0.01 | 0.00 |
| | | STD % | 0.33 | 0.18 | 0.10 | 0.31 | 0.27 | 0.26 | 0.15 | 0.00 |
| Inter | Blank | AVG | 19.89 | 19.81 | 19.79 | 19.97 | 20.00 | 20.01 | 19.98 | 20.08 |
| | | STD | 0.28 | 0.30 | 0.31 | 0.22 | 0.34 | 0.42 | 0.31 | 0.22 |
| | | STD % | 1.42 | 1.53 | 1.56 | 1.11 | 1.72 | 2.12 | 1.56 | 1.07 |
| | 1:100 | AVG | 9.36 | 8.85 | 8.89 | 8.25 | 8.54 | 7.67 | 8.58 | 9.07 |
| | | STD | 1.43 | 1.04 | 0.67 | 1.19 | 0.88 | 0.33 | 0.28 | 0.86 |
| | | STD % | 15.25 | 11.79 | 7.51 | 14.46 | 10.29 | 4.37 | 3.31 | 9.45 |

Figures 7A, 7B:
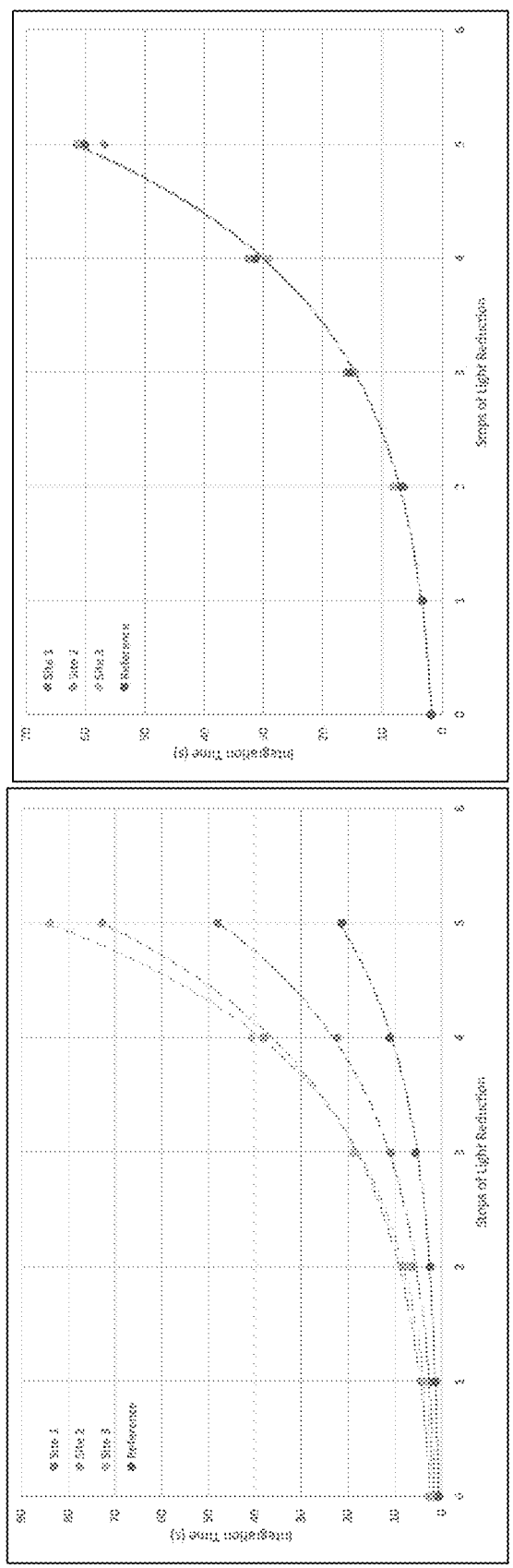
FIG. 7A shows pre-calibration set integration time for blank nitrocellulose slide to 60 seconds at each site.
FIG. 7B shows post-calibration set integration time for blank nitrocellulose slide to 60 seconds at each site.

Example 4. Set Integration Time for Blank Nitrocellulose Slide to 60 Seconds at Each Site Integration time over five stops of light reduction was analyzed for a blank nitrocellulose at three sites before and after calibration with dry calibration slides. Table 5 and FIG. 7 shows the pre-calibration and post-calibration integration time for blank nitrocellulose to 60 seconds at each site. The data shows substantial reduction in coefficient of variation after calibration.

TABLE 5 pre-calibration and post-calibration integration time

Pre-calibration

| Stops | Reference | Site 1 | Site 2 | Site 3 | CV |
|---|---|---|---|---|---|
| 0 | 0.63 | 1.23 | 2.40 | 1.80 | 50% |
| 1 | 1.15 | 2.47 | 4.40 | 3.67 | 49% |
| 2 | 2.44 | 6.30 | 8.12 | 7.16 | 41% |
| 3 | 5.44 | 10.85 | 18.72 | 18.48 | 48% |
| 4 | 11.09 | 22.20 | 37.86 | 40.72 | 50% |
| 5 | 21.27 | 47.93 | 72.71 | 83.90 | 49% |

TABLE 5-continued pre-calibration and post-calibration integration time

Post-calibration

| Stops | Reference | Site 1 | Site 2 | Site 3 | CV | −ΔCV |
|---|---|---|---|---|---|---|
| 0 | 0.63 | 0.58 | 0.64 | 0.63 | 4% | 92% |
| 1 | 1.15 | 1.16 | 1.20 | 1.22 | 3% | 95% |
| 2 | 2.44 | 2.94 | 2.26 | 2.25 | 13% | 68% |
| 3 | 5.44 | 5.04 | 5.37 | 5.39 | 3% | 93% |
| 4 | 11.09 | 10.25 | 11.13 | 11.16 | 4% | 92% |
| 5 | 21.27 | 21.98 | 21.89 | 21.73 | 1% | 97% |

Example 5. Set Integration Time for 5-Stop Slide to 60 Seconds at Each Site

Figure 8A:
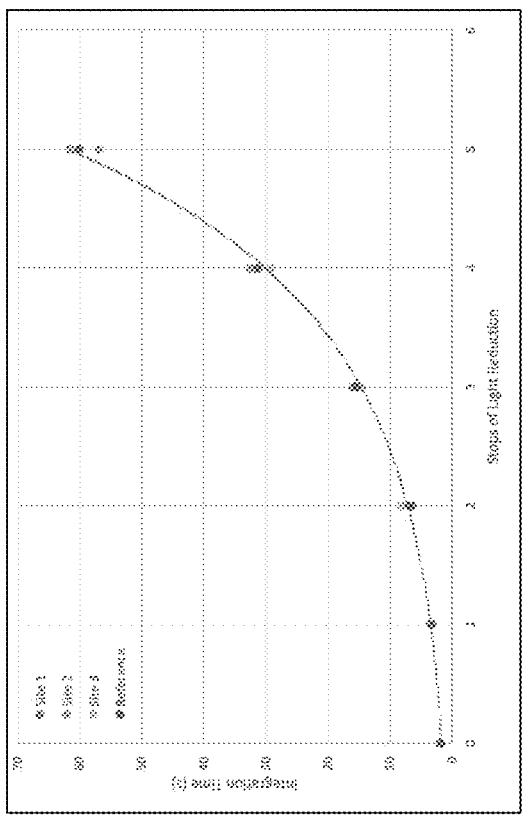
FIG. 8A shows pre-calibration set integration time for 5-stop slide to 60 seconds at each site.
Figure 8B:
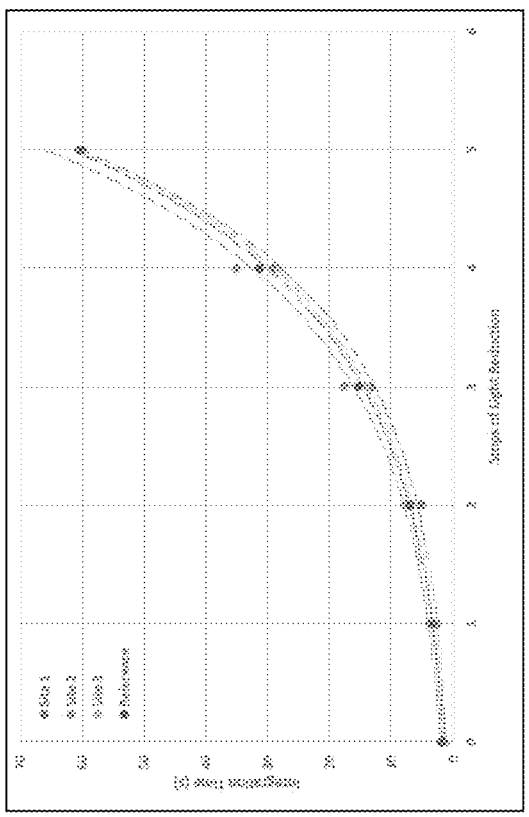
FIG. 8B shows post-calibration set integration time for 5-stop slide to 60 seconds at each site.

Integration time over five stops of light reduction was analyzed for a blank nitrocellulose at three sites before and after calibration with dry calibration slides. Table 6 and FIG. 8 shows the pre-calibration and post-calibration integration time for blank nitrocellulose to 60 seconds at each site. The data shows substantial reduction in coefficient of variation after calibration.

TABLE 6

Pre-calibration and post-calibration integration time for nitrocellulose

Pre-calibration

| Stops | Reference | Site 1 | Site 2 | Site 3 | CV |
|---|---|---|---|---|---|
| 0 | 1.77 | 1.29 | 1.93 | 1.51 | 17% |
| 1 | 3.24 | 2.62 | 3.85 | 3.09 | 16% |
| 2 | 6.89 | 5.12 | 7.70 | 7.63 | 18% |
| 3 | 15.34 | 13.22 | 17.56 | 13.88 | 13% |
| 4 | 31.27 | 29.12 | 35.05 | 28.10 | 10% |
| 5 | 60.05 | 160.16 | 60.49 | 59.75 | 1% |

Post-calibration

| Stops | Reference | Site 1 | Site 2 | Site 3 | CV | −ΔCV |
|---|---|---|---|---|---|---|
| 0 | 1.77 | 1.78 | 1.67 | 1.64 | 4% | 76% |
| 1 | 3.24 | 3.43 | 3.39 | 3.31 | 3% | 84% |
| 2 | 6.89 | 6.35 | 6.88 | 8.06 | 10% | 41% |
| 3 | 15.34 | 15.20 | 16.00 | 14.53 | 4% | 69% |
| 4 | 31.27 | 31.49 | 32.47 | 29.09 | 5% | 54% |
| 5 | 60.05 | 61.45 | 56.76 | 61.11 | 4% | −603% |

Example 6. Reduced Inter-Site Variation and Enhanced Consistency of Integration Times After Calibration Using the Dry Phosphorescent Calibration Slides Three point-of-care fluorescence readers were calibrated using four dry phosphorescent calibration slides. Integration times were analyzed at different stops of light reduction for eight sites within a fluorescence reader. FIGS. 9A-9F provides pre-calibration and post-calibration integration times generated with varying stops of light reduction for the different sites within a fluorescence reader. Each data point represents the average integration time for 3 runs. The results show that, before calibration (FIGS. 9A-9C), there was considerable variation across eight sites within a single reader and variation in output at a given site or calibration slide, between the three fluorescence readers. As shown in FIGS. 9D-9F, after calibration, there was synchronization of output between the eight sites with a fluorescence reader and consistent integration times for each calibration slide across the three fluorescence readers. Error bars are not visible because in all cases the error was either zero or close to zero. Additionally, the data shows that there is an inverse relationship between integration time and fluorescence intensity; as the integration time increases, fluorescence intensity decreases, and vice versa. Similarly, there is an inverse relationship between stops of light reduction and phosphorescence, as the stops of light reduction increases, the phosphorescence decreases, and vice versa.

Figure 10A:
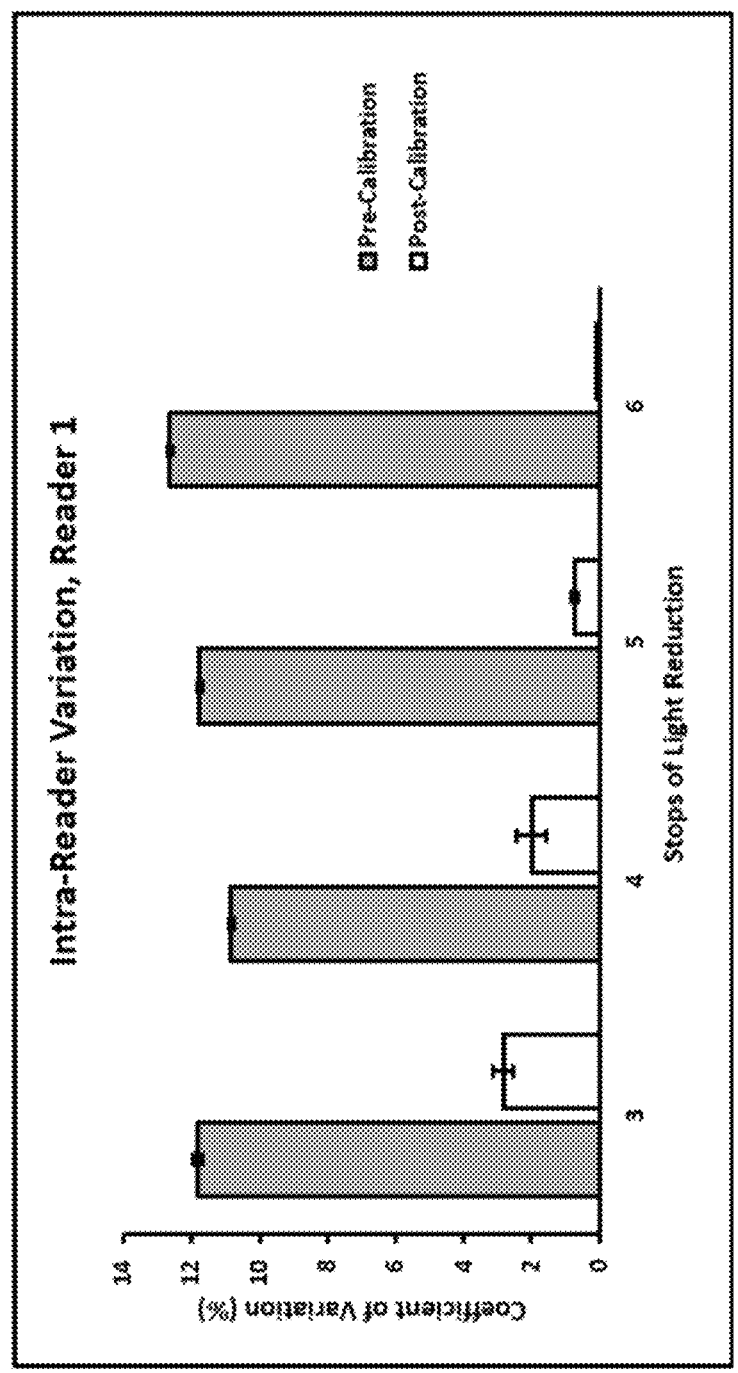
FIG. 10A shows intra-reader variation for each dry phosphorescent calibration slide across eight sites of in point-of-care fluorescence reader 1.
Figure 10B:
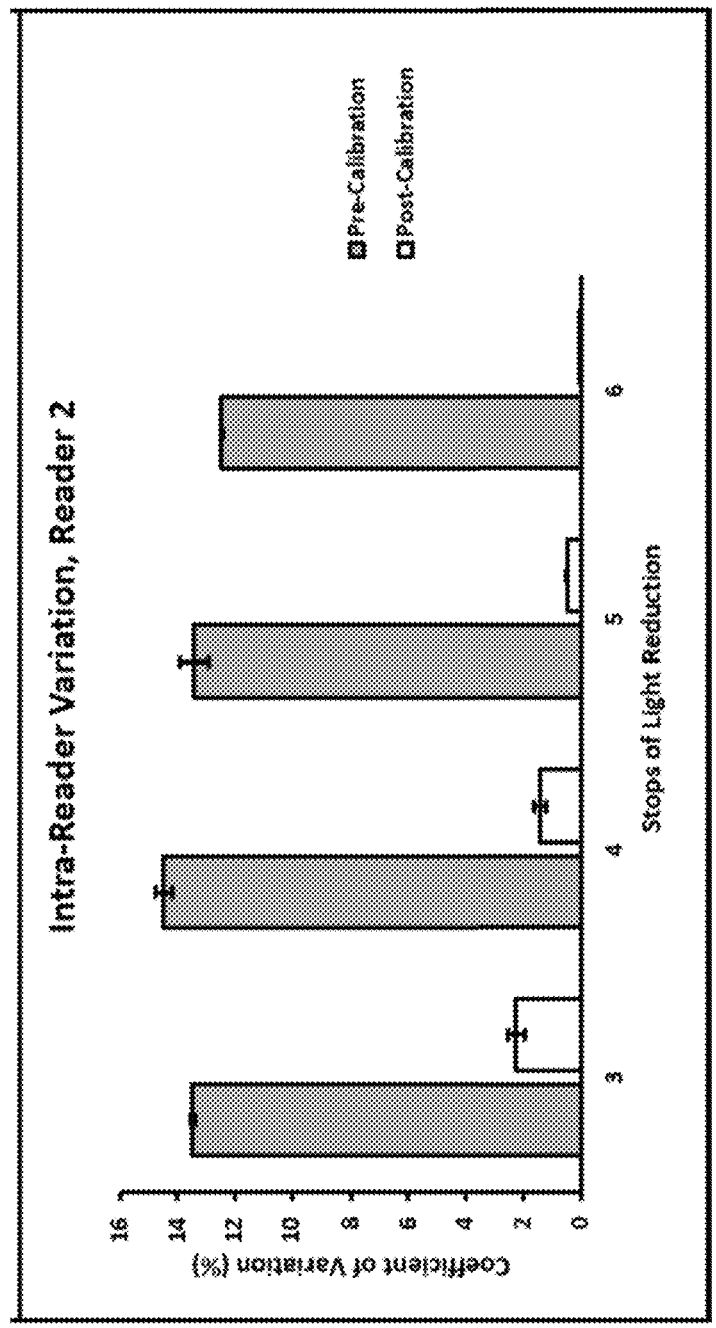
FIG. 10B shows intra-reader variation for each dry phosphorescent calibration slide across eight sites of in point-of-care fluorescence reader 2.
Figure 10C:
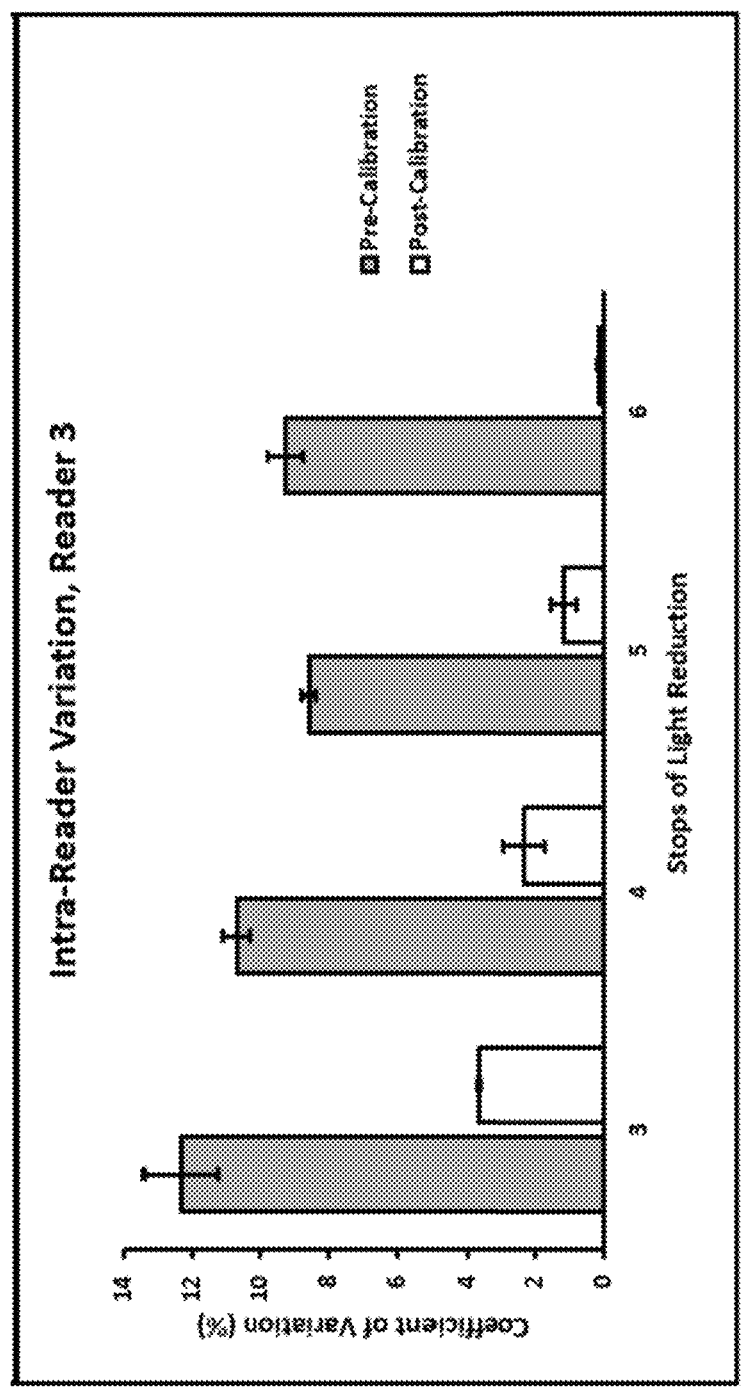
FIG. 10C shows intra-reader variation for each dry phosphorescent calibration slide across eight sites of in point-of-care fluorescence reader 3.
Figures 11A, 11B:
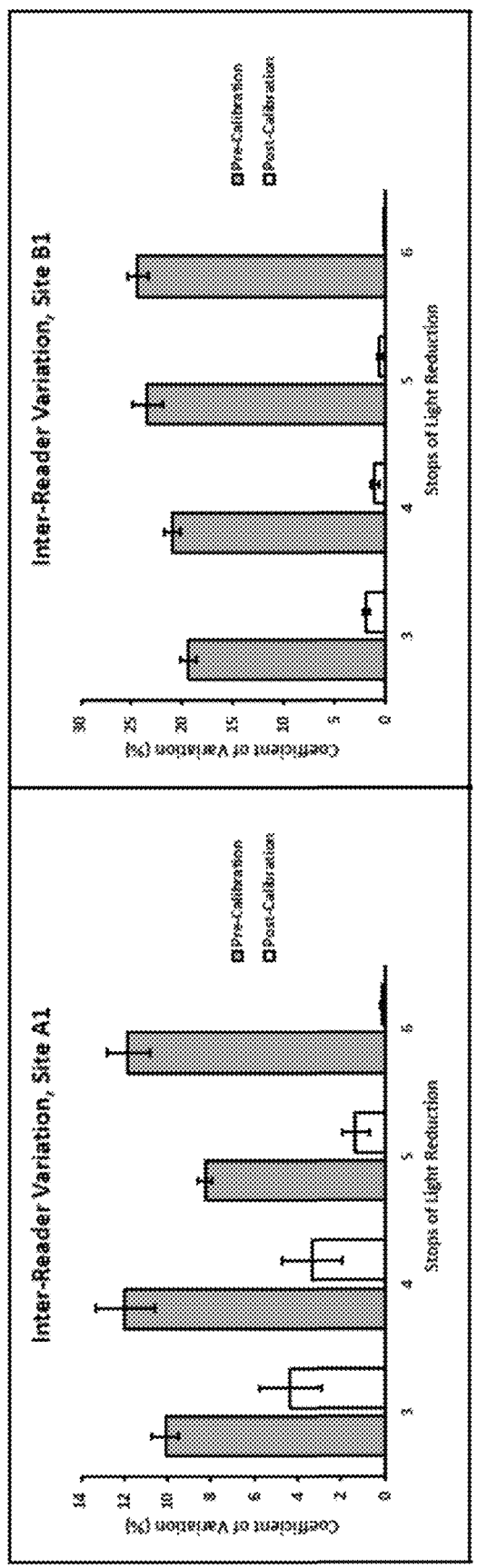
FIG. 11A shows inter-reader variation for each phosphorescent calibration slide at each site A1 across the three point-of-care fluorescence readers.
FIG. 11B shows inter-reader variation for each phosphorescent calibration slide at each site A2 across the three point-of-care fluorescence readers.
Figures 11C, 11D:
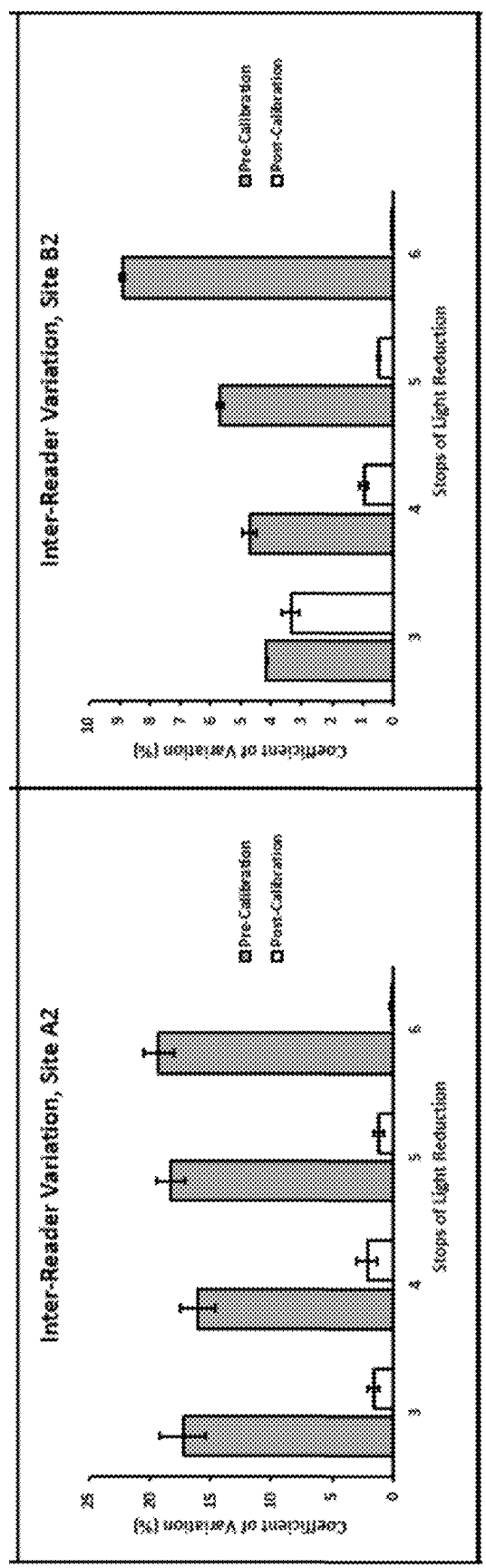
FIG. 11C shows inter-reader variation for each phosphorescent calibration slide at each site A3 across the three point-of-care fluorescence readers.
FIG. 11D shows inter-reader variation for each phosphorescent calibration slide at each site A4 across the three point-of-care fluorescence readers.
Figures 11E, 11F:
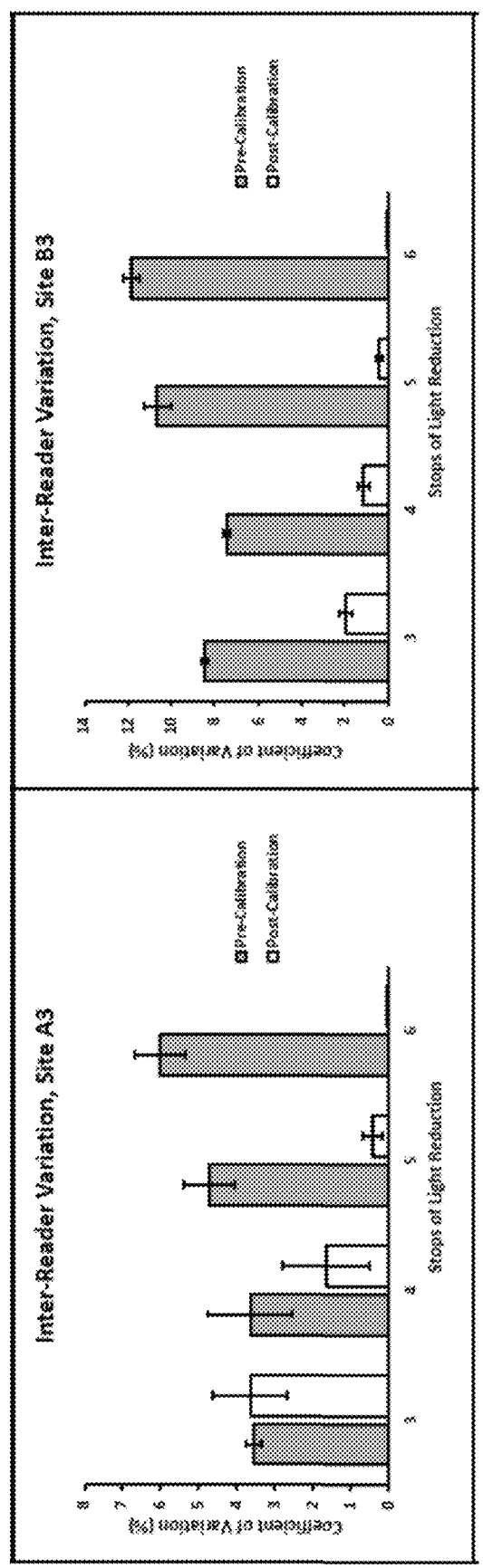
FIG. 11E shows inter-reader variation for each phosphorescent calibration slide at each site B1 across the three point-of-care fluorescence readers.
FIG. 11F shows inter-reader variation for each phosphorescent calibration slide at each site B2 across the three point-of-care fluorescence readers.
Figures 11G, 11H:
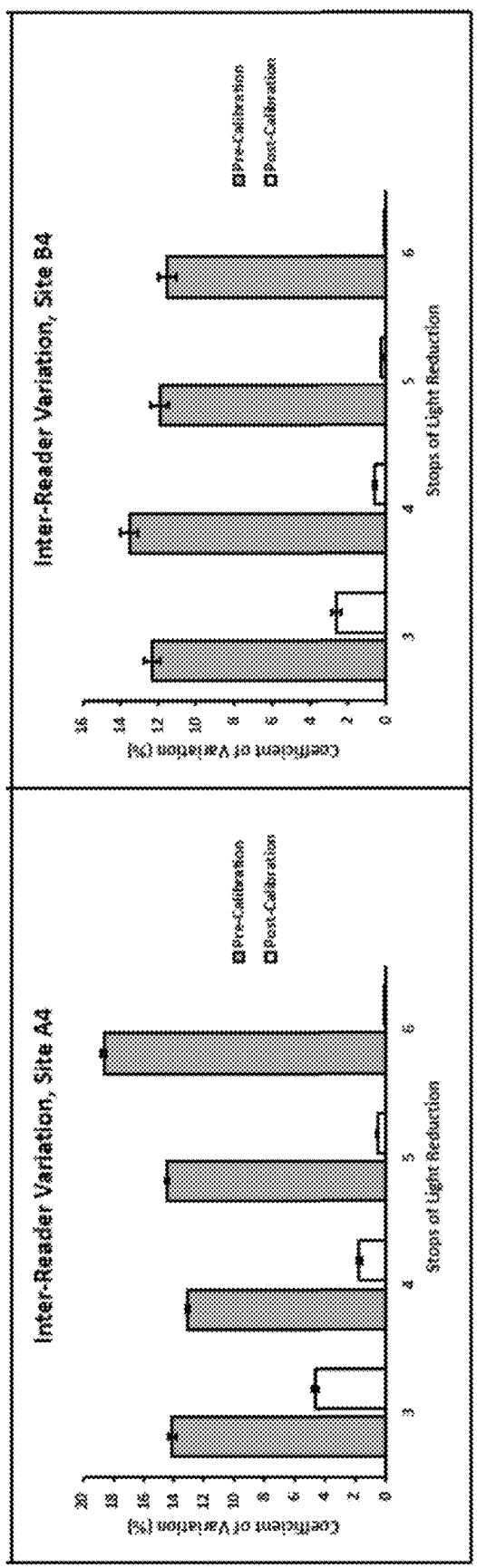
FIG. 11G shows inter-reader variation for each phosphorescent calibration slide at each site B3 across the three point-of-care fluorescence readers.
FIG. 11H shows inter-reader variation for each phosphorescent calibration slide at each site B4 across the three point-of-care fluorescence readers.

Example 7. Reduced Intra-Reader Variation After Calibration Using the Dry Phosphorescent Calibration Slides Pre and post calibration mean integration times for three stops of light reduction was calculated for eight sites within a fluorescence reader. Intra-reader variations were determined by calculating the coefficients of variation for each dry phosphorescent calibration slide across the eight sites for each fluorescence reader. The coefficients of variation were calculated using the mean integration times for the 3 stops of light reduction slide at each of the eight sites with the fluorescence reader. For example, in "Intra-Reader Variation, Reader 1," the coefficients of variation were calculated using the mean integration times for the 3 stops of light reduction slide at site A1 in Reader 1, site A2 in Reader 1, site A3 in Reader 1, site A4 in Reader 1, site B1 in Reader 1, site B2 in Reader 1, site B3 in Reader 1, and site B4 in Reader 1. Comparing the pre-calibration bar to the post-calibration bar for the 3 stops of light reduction slide shows that the calibration process reduced the coefficient of variation for across the 8 sites in Reader 1 from approximately 12% to approximately 3%; this was repeated for slides of 4, 5, and 6 stops of light reduction. The entire test was then repeated for Reader 2 and Reader 3. FIGS. 10A-10C provides coefficients of variation vs stops of light reduction within a fluorescence reader in three point-of-care fluorescence readers. The results show that compared to pre-calibration, the data for post-calibration for three stops of light reduction, showed approximately a reduction from 12% to 3% in coefficient of variation across the eight sites with a fluorescence reader.

Example 8. Reduced Inter-Reader Variation After Calibration Using the Dry Phosphorescent Calibration Slides Inter-reader variation was determined by calculating the coefficients of variation at a given site across three fluorescence readers using pre and post calibration mean integration times for three stops of light reduction at a given site across the three fluorescence readers. The coefficients of variation were calculated by determining mean integration times for the 3 stop stops of light reduction slide at a given site across three fluorescence readers. For example, in "Inter-Reader Variation, Site A1," the coefficients of variation were calculated using mean integration times for the 3 stop stops of light reduction slide at site A1 in Reader 1, site A1 in Reader 2, and site A1 in Reader 3. The entire test was then repeated for sites A2, A3, A4, B1, B2, B3, and B4. FIGS. 11A-11H provides coefficients of variation vs stops of light reduction for each dry phosphorescent calibration slide at eight different sites A1, A2, A3, A4, B1, B2, B3 and B4 across the three point-of care fluorescence readers, before and after calibration. Comparing the pre-calibration bar to the post-calibration bar for the 3 stops of light reduction slide shows that the calibration process reduced the coefficient of variation for site A1 across the 3 readers from approximately 10% to approximately 4%; this was repeated for slides of 4, 5, and 6 stops of light reduction (see FIGS. 11A-11H).

What is claimed is:

1. A device for performing dry calibration of a fluorescence detector, the device comprising a first layer comprising a dry phosphorescent material positioned adjacent to a second layer comprising a neutral density filter, and a housing containing the first and second layers.

2. The device of claim 1, wherein the first layer of dry phosphorescent material is positioned on a top surface of the second layer comprising the neutral density filter.

3. The device of claim 2, wherein the housing comprises at least two portions each comprising a plastic material, the two portions configured to reversibly engage one another to form the housing.

4. The device of claim 3, wherein the housing comprises a plastic material selected from the group consisting of polylactide (PLA), acrylonitrile butadiene styrene (ABS), polyethylene terephthalate glycol (PETG), nylon, thermoplastic urethane, polyvinyl alcohol, high impact polystyrene (HIPS), or a composite comprising carbon fiber, Kevlar, or fiberglass.

5. The device of claim 1, in the form of a slide.

6. The device of claim 1, wherein the dry phosphorescent material is a material characterized by the ability to reproduce a Stokes-shifted light emission associated with a selected fluorophore.

7. The device of claim 6, wherein the dry phosphorescent material mimics the selected fluorophore by absorbing light emitted by an LED of the fluorescence detector and emitting light that passes through the emission filter of the fluorescence detector.

8. The device of claim 7, wherein the phosphorescent material is selected based upon the excitation and emission characteristics of the selected fluorophore, and the optical configuration of the fluorescence detector.

9. The device of claim 7, wherein the phosphorescent material is selected from R600, R620, R630, R640, R650, R660, R675, R01, and R675.

10. The device of claim 1, wherein the neutral density filter comprises a material capable of simulating different fluorophore concentrations by adjusting the stops of light reduction.

11. The device of claim 10, wherein the neutral density filter is configured to modulate light intensity by increasing the stops of light reduction.

12. The device of claim 10, wherein the neutral density filter is configured to increase the stops of light reduction by a predetermined factor and thereby decrease light intensity by a corresponding predetermined factor.

13. The device of claim 1, wherein the housing further defines at least one or a plurality of apertures therethrough, wherein each aperture aligns with a calibration site of the fluorescence detector.

14. The device of claim 13, wherein the housing aperture size (diameter) is selected to modulate light intensity, wherein light intensity is modulated by increasing or decreasing the aperture diameter.

15. The device of claim 1, wherein the dry phosphorescent material is photostable.

16. The device of claim 1, wherein the dry phosphorescent material has a uniform surface.

17. A method of making a calibrating device for performing a dry calibration of a fluorescence detector, the method comprising:
  a. obtaining or having obtained a plastic housing having a top portion and a bottom portion defining a recess, the top and bottom portions configured to reversibly engage one another to form the housing;
  b. positioning a layer of a neutral density filter material in the recess of the bottom housing portion;
  c. stacking a layer of a dry phosphorescent material on top of the neutral density filter layer;
  d. positioning the housing top portion over the housing bottom portion and engaging the housing bottom portion with the housing top portion to form the housing.

18. The method of claim 17, further comprising applying an adhesive to interior contact surfaces of either or both of the housing portions before engaging the housing bottom portion with the housing top portion.

19. The method of claim 17, further comprising sizing the layer of the dry phosphorescent material and the layer of the neutral density filter to have approximately the same length and width.

\* \* \* \* \*